US010139819B2

(12) United States Patent
Hollida et al.

(10) Patent No.: US 10,139,819 B2
(45) Date of Patent: Nov. 27, 2018

(54) VIDEO ENABLED INSPECTION USING UNMANNED AERIAL VEHICLES

(71) Applicant: Innovative Signal Analysis, Inc., Richardson, TX (US)

(72) Inventors: Raymond Hollida, San Antonio, TX (US); Daniel P. Gibbs, Murphy, TX (US); Dylan Forciea, Edmond, OK (US); Robert Wayne Tibbit, Garland, TX (US)

(73) Assignee: Innovative Signal Analysis, Inc., Richardson, TX (US)

( * ) Notice: Subject to any disclaimer, the term of this patent is extended or adjusted under 35 U.S.C. 154(b) by 0 days.

(21) Appl. No.: 14/830,990

(22) Filed: Aug. 20, 2015

(65) Prior Publication Data

US 2016/0054733 A1    Feb. 25, 2016

Related U.S. Application Data

(60) Provisional application No. 62/040,736, filed on Aug. 22, 2014.

(51) Int. Cl.
*G05D 1/00*        (2006.01)
*G05D 1/02*        (2006.01)
(Continued)

(52) U.S. Cl.
CPC ......... *G05D 1/0038* (2013.01); *B64C 39/024* (2013.01); *G05D 1/0016* (2013.01);
(Continued)

(58) Field of Classification Search
None
See application file for complete search history.

(56) References Cited

U.S. PATENT DOCUMENTS 3,816,741 A    6/1974 Macall
3,978,281 A    8/1976 Burrer
(Continued)

FOREIGN PATENT DOCUMENTS

GB    2239762 B    3/1994

OTHER PUBLICATIONS

Prosecution history from U.S. Appl. No. 12/908,281, including: Non-Final Rejection dated Mar. 22, 2013, Amendment filed Aug. 22, 2013, Final Rejection dated Dec. 31, 2013, Amendment and RCE filed Mar. 18, 2014, Non-Final Rejection dated Apr. 15, 2014, Amendment filed May 27, 2014, Final Rejection dated Jun. 9, 2014, Response After Final filed Jul. 1, 2014, Advisory Action dated Jul. 28, 2014.

(Continued)

*Primary Examiner* — Thomas G Black
*Assistant Examiner* — Demetra R Smith-Stewart
(74) *Attorney, Agent, or Firm* — Kelly, Holt & Christenson, PLLC; Wesley W. Malherek

(57) ABSTRACT

An unmanned vehicle control system is provided. In one embodiment, the control system comprises an image acquisition device configured to capture an image. A vehicle is configured to receive and execute a vehicle control command. A control device is configured to generate the vehicle control command. The control device comprises a display component, an input component and a processor. The display component is configured to present the image obtained from the image acquisition device. The input component is configured to receive an input, wherein the input at least references the obtained image. The processor is configured to obtain the image from the image acquisition device, analyze the received input, and generate the vehicle control command. A communication component is configured to (Continued)

facilitate transmission of the vehicle control command to the vehicle.

17 Claims, 13 Drawing Sheets

(51) Int. Cl.
  *B64C 39/02* (2006.01)
  *H04N 7/18* (2006.01)
  *H04N 5/232* (2006.01)
(52) U.S. Cl.
  CPC ....... *G05D 1/0094* (2013.01); *H04N 5/23293* (2013.01); *H04N 7/185* (2013.01); *B64C 2201/127* (2013.01); *B64C 2201/146* (2013.01)

(56) References Cited

U.S. PATENT DOCUMENTS

| | | | |
|---|---|---|---|
| 4,043,672 A | 8/1977 | Baumgartner | |
| 5,022,723 A | 6/1991 | Schmidt et al. | |
| 5,149,969 A | 9/1992 | Fouilloy et al. | |
| 5,339,188 A | 8/1994 | Fritzel | |
| 5,610,730 A | 3/1997 | Osipchuk | |
| 5,721,585 A | 2/1998 | Keast et al. | |
| 5,870,220 A | 2/1999 | Migdal et al. | |
| 5,923,365 A | 7/1999 | Tamir et al. | |
| 6,034,716 A | 3/2000 | Whiting et al. | |
| 6,064,423 A | 5/2000 | Geng | |
| 6,081,278 A | 6/2000 | Chen | |
| 6,147,701 A | 11/2000 | Tamura et al. | |
| 6,195,609 B1 | 2/2001 | Pilley et al. | |
| 6,226,035 B1 | 5/2001 | Korein et al. | |
| 6,304,284 B1 | 10/2001 | Dunton et al. | |
| 6,335,758 B1 | 1/2002 | Ochi et al. | |
| 6,356,296 B1 | 3/2002 | Driscoll, Jr. et al. | |
| 6,373,508 B1 | 4/2002 | Moengen | |
| 6,421,185 B1 | 7/2002 | Wick et al. | |
| 6,456,232 B1 | 9/2002 | Milnes et al. | |
| 6,654,063 B1 | 11/2003 | Tadatsu | |
| 6,665,003 B1 | 12/2003 | Peleg et al. | |
| 6,717,608 B1 | 4/2004 | Mancuso et al. | |
| 6,734,808 B1 | 5/2004 | Michaelson et al. | |
| 6,738,073 B2 | 5/2004 | Park et al. | |
| 6,744,403 B2 | 6/2004 | Milnes et al. | |
| 6,757,446 B1 | 6/2004 | Li et al. | |
| 6,765,566 B1 | 7/2004 | Tsao | |
| 6,795,113 B1 | 9/2004 | Jackson et al. | |
| 6,798,923 B1 | 9/2004 | Hsieh et al. | |
| 6,831,693 B1 | 12/2004 | Sunaga | |
| 6,909,438 B1 | 6/2005 | White et al. | |
| 6,927,905 B1 | 8/2005 | Kashitani et al. | |
| 6,975,353 B1 | 12/2005 | Milinusic et al. | |
| 7,058,239 B2 | 6/2006 | Singh et al. | |
| 7,092,132 B2 | 8/2006 | Matsuda | |
| 7,136,096 B1 | 11/2006 | Yamagishi et al. | |
| 7,206,017 B1 | 4/2007 | Suzuki | |
| 7,245,744 B2 | 7/2007 | Kaneko et al. | |
| 7,256,834 B1 | 8/2007 | Sagefalk et al. | |
| 7,260,241 B2 | 8/2007 | Fukuhara et al. | |
| 7,301,557 B2 | 11/2007 | Kakou et al. | |
| 7,489,330 B2 | 2/2009 | Hayashi et al. | |
| 7,495,694 B2 | 2/2009 | Cutler | |
| 7,528,864 B2 | 5/2009 | Sassa | |
| 7,583,815 B2 | 9/2009 | Zhang et al. | |
| 7,660,439 B1 | 2/2010 | Lu et al. | |
| 7,710,463 B2 | 5/2010 | Foote | |
| 7,801,328 B2 | 9/2010 | Au et al. | |
| 7,801,330 B2 | 9/2010 | Zhang et al. | |
| 7,884,848 B2 | 2/2011 | Ginther | |
| 7,911,517 B1* | 3/2011 | Hunt, Jr. ............. G06K 9/0063 | |
| | | | 348/272 |
| 8,072,482 B2 | 12/2011 | Gibbs et al. | |
| 8,099,201 B1 | 1/2012 | Barber et al. | |
| 8,511,606 B1* | 8/2013 | Lutke ................. B64C 39/028 | |
| | | | 244/100 R |
| 8,521,339 B2* | 8/2013 | Gariepy ............... B64C 39/024 | |
| | | | 244/190 |
| 8,670,020 B2 | 3/2014 | Gibbs et al. | |
| 8,792,002 B2 | 7/2014 | Gibbs et al. | |
| 8,803,972 B2 | 8/2014 | Gibbs et al. | |
| 2001/0005218 A1 | 6/2001 | Gloudemans et al. | |
| 2002/0024599 A1 | 2/2002 | Fukuhara et al. | |
| 2002/0054211 A1 | 5/2002 | Edelson et al. | |
| 2002/0071122 A1 | 6/2002 | Kulp et al. | |
| 2002/0109772 A1 | 8/2002 | Kuriyama et al. | |
| 2002/0126226 A1 | 9/2002 | Dudkowski | |
| 2002/0196962 A1 | 12/2002 | Fukuhara et al. | |
| 2003/0142203 A1 | 7/2003 | Kawakami et al. | |
| 2003/0171169 A1 | 9/2003 | Cavallaro et al. | |
| 2004/0021766 A1 | 2/2004 | Daniilidis et al. | |
| 2004/0022453 A1 | 2/2004 | Kusama et al. | |
| 2004/0061774 A1 | 4/2004 | Wachtel et al. | |
| 2005/0029458 A1 | 2/2005 | Geng et al. | |
| 2005/0031204 A1 | 2/2005 | Kaneko et al. | |
| 2005/0259146 A1 | 11/2005 | Berdugo | |
| 2005/0259158 A1 | 11/2005 | Jacob et al. | |
| 2006/0017816 A1 | 1/2006 | Gat | |
| 2006/0023074 A1 | 2/2006 | Cutler | |
| 2006/0069497 A1 | 3/2006 | Wilson, Jr. | |
| 2006/0072020 A1 | 4/2006 | McCutchen | |
| 2006/0227997 A1 | 10/2006 | Au et al. | |
| 2006/0265109 A1 | 11/2006 | Canu-Chiesa et al. | |
| 2006/0268102 A1 | 11/2006 | Ginther | |
| 2006/0283317 A1 | 12/2006 | Melnychuk et al. | |
| 2007/0140427 A1 | 6/2007 | Jensen et al. | |
| 2007/0244608 A1* | 10/2007 | Rath ................... G05D 1/0038 | |
| | | | 701/3 |
| 2008/0068451 A1 | 3/2008 | Hyatt | |
| 2008/0088719 A1 | 4/2008 | Jacob et al. | |
| 2008/0125896 A1* | 5/2008 | Troy ................... G05D 1/0033 | |
| | | | 700/110 |
| 2008/0166015 A1 | 7/2008 | Haering et al. | |
| 2008/0185526 A1 | 8/2008 | Horak et al. | |
| 2008/0215204 A1* | 9/2008 | Roy ................... G05D 1/0044 | |
| | | | 701/28 |
| 2008/0219509 A1 | 9/2008 | White et al. | |
| 2008/0252527 A1 | 10/2008 | Garcia | |
| 2008/0263592 A1 | 10/2008 | Kimber et al. | |
| 2008/0291279 A1 | 11/2008 | Samarasekera et al. | |
| 2009/0087029 A1 | 4/2009 | Coleman et al. | |
| 2009/0223354 A1 | 9/2009 | Root, Jr. | |
| 2009/0260511 A1 | 10/2009 | Melnychuk et al. | |
| 2009/0278932 A1* | 11/2009 | Yi ........................ H04N 7/185 | |
| | | | 348/147 |
| 2010/0002082 A1 | 1/2010 | Buehler et al. | |
| 2010/0013926 A1 | 1/2010 | Lipton et al. | |
| 2010/0026802 A1 | 2/2010 | Titus et al. | |
| 2010/0045799 A1 | 2/2010 | Lei et al. | |
| 2010/0073460 A1 | 3/2010 | Gibbs et al. | |
| 2010/0073475 A1 | 3/2010 | Gibbs et al. | |
| 2010/0128110 A1 | 5/2010 | Mavromatis | |
| 2010/0156630 A1 | 6/2010 | Ainsbury | |
| 2010/0157055 A1* | 6/2010 | Pechatnikov ............ G06T 7/20 | |
| | | | 348/144 |
| 2010/0215212 A1* | 8/2010 | Flakes, Jr. ........... G01M 5/0025 | |
| | | | 382/100 |
| 2010/0228406 A1* | 9/2010 | Hamke ................ G05D 1/0038 | |
| | | | 701/3 |
| 2011/0081043 A1 | 4/2011 | Sabol et al. | |
| 2011/0150272 A1 | 6/2011 | GunasekaranBabu et al. | |
| 2011/0169867 A1 | 7/2011 | Kniffen et al. | |
| 2011/0298923 A1* | 12/2011 | Mukae .................. G08G 1/205 | |
| | | | 348/144 |
| 2011/0299733 A1 | 12/2011 | Jahangir et al. | |
| 2012/0120189 A1 | 5/2012 | Gibbs et al. | |
| 2013/0079954 A1* | 3/2013 | Malecki ............... G05D 1/0676 | |
| | | | 701/2 |
| 2014/0146173 A1* | 5/2014 | Joyce .................. G01C 11/04 | |
| | | | 348/144 |
| 2014/0316614 A1* | 10/2014 | Newman ............. G06Q 30/0611 | |
| | | | 701/3 |

(56) References Cited

U.S. PATENT DOCUMENTS

| | | | |
|---|---|---|---|
| 2014/0320595 A1 | 10/2014 | Gibbs et al. | |
| 2014/0327733 A1* | 11/2014 | Wagreich | H04N 7/185 348/37 |
| 2015/0248584 A1* | 9/2015 | Greveson | G06K 9/00476 382/113 |
| 2015/0346722 A1* | 12/2015 | Herz | G05D 1/0038 701/2 |

OTHER PUBLICATIONS

Amendment Submitted/Entered with Filing of CPA/RCE (dated Sep. 9, 2014), Non-Final Rejection dated Oct. 22, 2014, Amendment filed Jan. 22, 2015, Non-Final Rejection dated May 15, 2015, Amendment filed Aug. 3, 2015 and Final Rejection dated Nov. 19, 2015, 221 pages.

Hampapur et al., "Smart Video Surveillance", IEEE Signal Processing Magazine, pp. 38-51, Mar. 2005.

Girgensohn et al. "DOTS: Support for Effective Video Surveillance", ACM Multimedia 2007, pp. 423-432, Sep. 2007.

Khoshabeh et al., "Multi-Camera Based Traffice Flow Characterization & Classification", Proceedings of the 2007 IEEE Intelligent Transportation Conference, pp. 259-264, Sep. 2007.

Pham et al., "A Multi-Camera Visual Surveillance System for Tracking of Reoccurrences of People", First ACM/IEEE International Conference on Distributed Smart Cameras (ICDSC '07), pp. 164-169, Sep. 2007.

Saleemi et al., "Probabilistic Modeling of Scene Dynamics for Applications in Visual Surveillance", IEEE Transactions on Pattern Analysis and Machine Intelligence, v. 31, n. 8, pp. 1472-1485, Aug. 2009.

USDOT, Transview (TV32) Installation and Operations Guide for Maritime Safety and Security Information System (MSSIS), Version 7.7.4B, revision 1, Jun. 18, 2009.

Zhang et al., "Ship Tracking Using Background Subtraction and Inter-frame Correlation", 2nd International Congress on Image and Signal Processing (CISP '09), pp. 1-4, Oct. 17, 2009.

Chen et al., "A Trajectory-Based Ball Tracking Framework with Visual Enrichment for Broadcast Baseball Videos", Journal of Information Science and Engineering, v. 24, pp. 143-157, 2008.

Kasi et al., "Yet Another Algorithm for Pitch Tracking", IEEE International Conference on Acoustics, Speech, and Signal Processing (ICASSP), v. 1, pp. 361-364, May 2002.

Whiting, "Science lesson for baseball", SFGate.com, Sep. 19, 2009.

Assfalg et al., "Semantic annotation of soccer videos: automatic highlights identification", Computer Vision and Image Understanding, v. 92, pp. 285-305, 2003.

Cavallaro, "The FoxTrax Hockey Puck Tracking System" . IEEE Computer Graphics and Applicaitons, pp. 6-12, Mar.-Apr. 1997.

D'Orazio et al., "A Visual system for real time detection of goal events during soccer matches", Computer Vision and Image Understanding, v. 113, pp. 622-632, 2009.

Figueroa et al., "Tracking soccer players aiming their kinematic motion analysis", Computer Vision and Understanding, v. 101, pp. 122-135, 2006.

Khatoonabadi et al. "Automatic soccer players tracking in goal scenes by camera motion elimination", Image and Vision Computing, v. 27, pp. 469-479, 2009.

Liu et al., "Extracting 3D information from broadcast soccer video", Image and Vision Computing , v. 24, pp. 1146-1162, 2006.

Liu et al., "Automatic player detection, labeling and tracking in broadcast soccer video", Pattern Recognition Letters, v. 30, pp. 103-113, 2009.

Pallavi et al., "Ball detection from broadcast soccer videos using static and dynamic features", Journal of Visual Communication and Image Representation, v. 19, n. 7, pp. 426-436, Oct. 2008.

Piciarelli et al, "On-line trajectory clustering for anomalous events detection", Pattern Recognition Letters, v. 27, pp. 1835-1842. 2006.

Xie et al, "Structure analysis of soccer video with domain knowledge and hidden Markov models", Pattern Recognition Letters, v. 25, pp. 767-775, 2004.

Zhang et al., "People detection in low-resolution video with nonstationary background", Image and Vision Computing, v. 27, pp. 437-443, 2009.

Zhu et al., "Trajectory Based Events Tactics Analysis in Broadcast Sports Video", Proceedings of the 15th International Conference on Multimedia, pp. 58-67, 2007.

Prosecution history from U.S. Appl. No. 14/314,646, including: Requirement for Election/ Restriction dated Aug. 12, 2015, Response to Restriction Requirement filed Oct. 12, 2015, and non-final Rejection dated Dec. 30, 2015. 18 pages.

Durucan, Emrullah, "Change Detection and Background Extraction by Linear Algebra", Proceedings of the IEEE vol. 89, No. 10, Oct. 2001, pp. 1368-1381.

Blair, Brian J. "The Laser Imaging Sensor: a medium altitude, digitization-only, airborne laser altimeter for mapping vegetation and topography", ISPRS Journal for Photogrammetry & Sensing 54 (1999), pp. 115-122.

\* cited by examiner

VIDEO ENABLED INSPECTION USING UNMANNED AERIAL VEHICLES

CROSS-REFERENCE TO RELATED APPLICATIONS

The present application is based on and claims the benefit of U.S. Provisional Patent Application Ser. No. 62/040,736, filed Aug. 22, 2014, the content of which application is hereby incorporated by reference in its entirety.

BACKGROUND

Camera control methods such as pan, tilt and/or zoom control are known in the art. These different camera control methods may be used in order to train the field of view of a camera onto a target, for example, to put the target under surveillance. It is common for cameras to be delivered to a target location, for example, in order to monitor a mission in progress. For example, it may be important while combatting a forest fire to monitor the progress of fire fighters in areas where other forms of direct communication may be difficult. These cameras may be delivered to a target location, for example, by way of an unmanned aerial vehicle (UAV). UAVs are typically piloted to the target area by line-of-sight or by first person view. However, use of a UAV to direct a camera to a target requires a pilot trained in flying UAVs. Additionally, while preprogramming a desired target location into a UAV is known, in a disaster situation such GPS coordinates may not be readily available. This presents a problem in monitoring the ongoing progress of responding to a natural disaster or monitoring another situation in that a trained UAV pilot is required to fly with now pre-known GPS coordinates.

Another concern in the use of UAVs to deliver cameras to a targeted area for surveillance is that a targeted area may change, for example in a scenario where UAVs are dispatched with cameras to monitor a forest fire, by the time the UAV reaches the target area the fire may be quelled in that area or a hot spot may have broken out elsewhere, requiring a pilot of the UAV or a programmer of the path of UAV to change the path to reflect the change in conditions.

The discussion above is merely to provide for general background information, and is not intended to be used as an aid in determining the scope of the claimed subject matter.

SUMMARY

An unmanned vehicle control system is provided. In one embodiment, the control system comprises an image acquisition device configured to capture an image. A vehicle is configured to receive and execute a vehicle control command. A control device is configured to generate the vehicle control command. The control device comprises a display component, an input component and a processor. The display component is configured to present the image obtained from the image acquisition device. The input component is configured to receive an input, wherein the input at least references the obtained image. The processor is configured to obtain the image from the image acquisition device, analyze the received input, and generate the vehicle control command. A communication component is configured to facilitate transmission of the vehicle control command to the vehicle.

These and various other features and advantages that characterize the claimed embodiments will become apparent upon reading the following detailed description and upon reviewing the associated drawings.

DETAILED DESCRIPTION

In accordance with various embodiment described herein, a UAV may be directed to a target location by the use of waypoints, or a series of preprogrammed positions along a path taken by the UAV from a starting point to the target location. A waypoint, in one embodiment, may be a set of preprogrammed, known, GPS coordinates corresponding to a location. However, a waypoint may also be, in one embodiment, determined by a received input from an operator of the UAV, for example through the use of touch screen technology with a current picture including the target as shown, for example, in FIGS. 2A-2E and described with respect to exemplary methods herein.

The waypoints may be generated, for example, on the fly by a controller of the UAV by selection of a position within an image of a target zone. The image may, in one embodiment, be generated by a live video or camera image taken from a camera currently viewing the target area. For example, in one embodiment, the image may be generated by a cue camera, such as, but not limited to, any one of various types of wide area view (WAV) cameras. These WAV cameras may be camera arrays, scanning and rotating cameras, or other cameras with wide angles or anamorphic lens systems. In one embodiment, an operator selection of a position on the live video or image feed from the cue camera is received and translated into a set of coordinates that are provided to the UAV, for example as described herein.

Figure 1A:
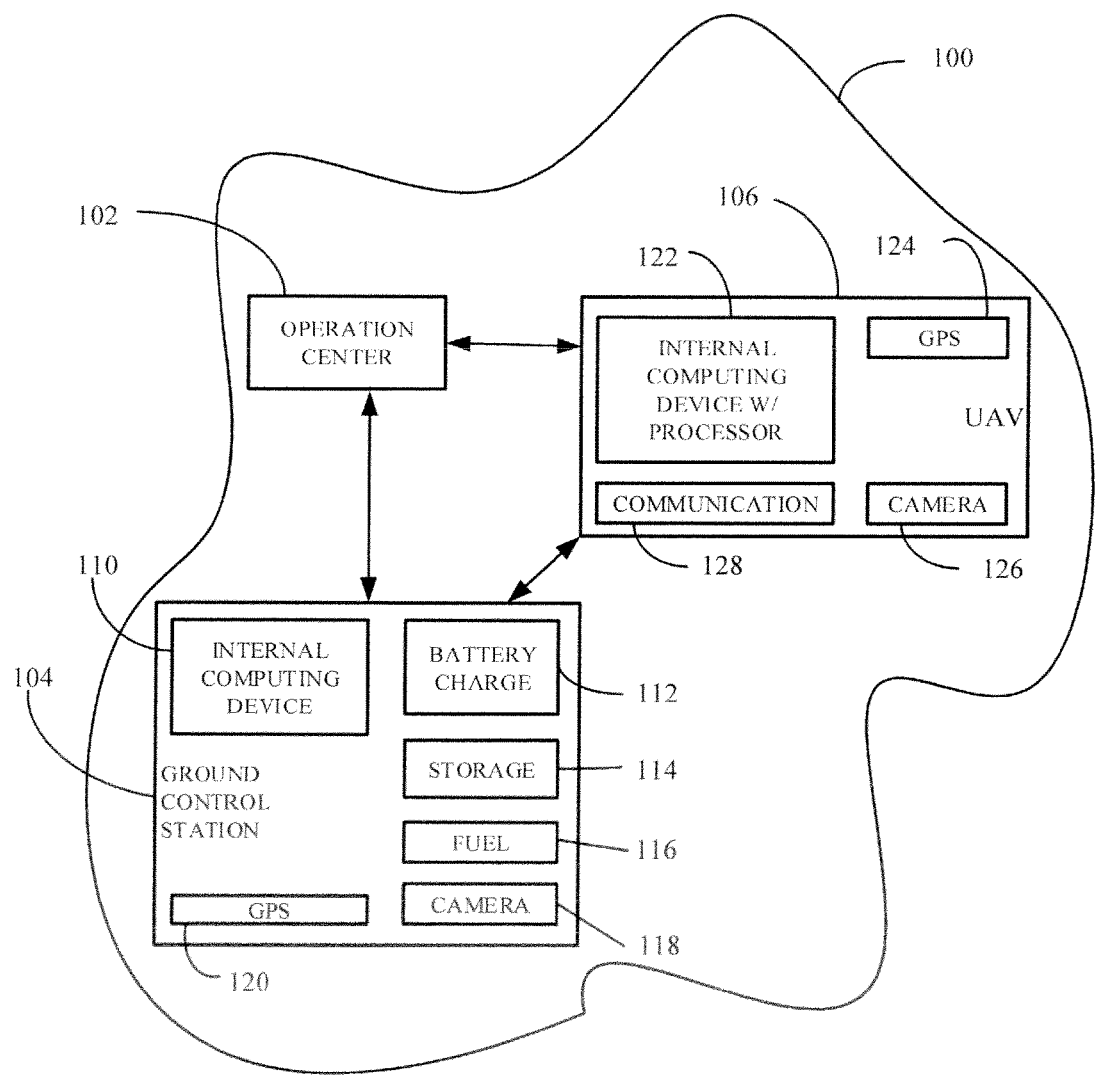
FIG. 1A illustrates an exemplary network environment for the control of a UAV in accordance with one embodiment of the present invention.

FIG. 1A illustrates an exemplary network environment for the control of a UAV in accordance with one embodiment of the present invention. In one embodiment, the network environment may comprise a network 100, including an operation center 102, a ground control station 104 and a UAV 106 communicably coupled over the network 100. In one embodiment, the network 100 may comprise intranet, internet, radio signals, or other communication mechanisms allowing for communication between the operation center 102, the ground control station 104, and the UAV 106.

Additionally, in one embodiment, the network 100 may be a secured network 100, and may comprise encrypted communication between the operation center 102, ground control station 104 and/or the UAV 106.

In one embodiment, the operation center 102 may be a manned or unmanned base of operations that generates the directions for the UAV 106. The operations center 102 may comprise a computing device with a display configured to allow an operator to communicate with and control the UAV 106. In one embodiment, the operator may control the UAV 106 using the slew-to-cue control methods as described herein. The operator may communicate with the UAV 106 directly. However, in another embodiment where the UAV 106 is too far away to directly communicate with the operations center 102; the operation center 102 may communicate with the UAV 106 through the use of a ground control station 104 or another suitable communication intermediary. This may be the case, for example in an embodiment where the UAV 106 is too far from the operation center 102 for direct communication over the network from the operation center 102 to the UAV 106.

In one embodiment, a slew-to-cue control method comprises sending a movement command to a UAV 106, based on a selected position, or cue, in an image received from a cue camera. The cue camera may be a Wide-Angle-View (WAV) camera, in one embodiment, located remote from the UAV 106. For example, the cue camera may be located on a ground control station 104. In another example, the cue camera may be located on the operations center 102. In another embodiment, the cue image is provided from a camera associated with the UAV 106. The image, in one embodiment, may comprise a video stream provided substantially in real-time. In another embodiment, the image is a most-recently captured image from the UAV 106, provided substantially in real-time.

The cue, on which the movement command may be based, in one embodiment, is provided by an operator selecting a pixel, representing a new desired location for the UAV 106, in a received image from the cue camera. The operator may select the cue position, in one embodiment, using a joystick control mechanism. In another embodiment, the operator may select the cue position using a computer mouse or other external selection mechanism. In another embodiment, the operator may select the cue position by contacting a touch screen interface presenting the image.

In one embodiment, the ground control station 104 may comprise one or more features allowing it to be, alternatively, a launching station or a waypoint for the UAV 106. The ground control station 104 includes at least an internal computing device 110 with communications capability to relay commands from the operation center 102 to the UAV 106. In one embodiment, the ground control station 104 may also comprise a charging station 112 or a fueling station 116. These may be important features to allow the UAV 106 to travel from the operation center 102 to a target zone. These features may also be helpful in order to ensure that one or more cameras 126 associated with the UAV 106 are sufficiently charged to image a target zone for a length of a mission. In one embodiment, the ground control station 104 may include storage component 114 such that it can receive images and/or video feed from the UAV 106 and store them separately, for example as a backup, from an onboard storage component within the UAV 106. Alternatively, the storage component 114 may be used as a relay to translate live camera feed from the UAV 106 to the operation center 102 such that the operation center 102 receives the camera feed substantially instantaneously. In another embodiment, the camera feed is received by the operation center 102 after a delay. The ground control station 104 may also have one or more cameras 118 allowing for the ground control station to take live camera or video feed that captures a view comprising both the target area and the UAV 106. The ground control station 104 may also include a GPS unit 120. Alternatively, the location of the ground control station 104 is known.

The ground control station 104 may, in one embodiment, be shore or battery powered with a generator, a solar or other appropriate backup power mechanism. Additionally, the ground control station 104 may comprise a regenerative power source such as, for example, portable solar panels. The ground control station 104 may, in one embodiment, support without attendance by an operator: battery recharges, offload of high definition video, charge of sensor package, and/or rest up during extended missions.

The UAV 106 may comprise at least an internal computing device 122 that comprises at least a processor. The UAV may also comprise a GPS unit 124. The UAV 106 may also comprise one or more cameras 126 configured to take live video feed and/or still camera images. The UAV 106 may also comprise a communications interface 128 capable of communicating with the ground control station 104 and/or the operations center 102. In one embodiment, communication between the UAV 106 and the operations center 102, either directly or through the ground control station 104, comprises transmitting live video feed received from the one or more cameras 126 on the UAV 106. In another embodiment, communication comprises sending images from the UAV 106, received from the one or more cameras 126.

Hostile Factors Facing UAV Operation

UAVs often are required to fly in imperfect conditions comprising one or more hostile conditions, for example: extreme distance, inaccessibility, inclement weather, extended missions, and visually impaired conditions. These, as well as other exemplary hostile factors, make the use of a UAV preferable to the use of manned vehicles. However the use of a UAV, such as UAV 106, creates additional challenges for an operator/pilot of the UAV using, for example, first person view or line of sight to fly the UAV as, often, the hostile conditions make flight using these conventional methods challenging.

One known hostile factor is long distance between the operation center 102 and the ground control station 104, requiring travel of the UAV 106 across miles of terrain not necessarily visible to the operator. Further, the UAV 106 may then need to travel further from the ground control station 104 to a target area, which presents a similar problem, especially as the target area may not correspond to known GPS coordinates. Integrating a camera on the UAV 106, for example camera unit 126, and implementing an automatic slew-to-cue method of generating directions described herein may allow for directing transportation of the UAV 106 from the operation center 102, or other exemplary starting point, to a target position at a remote location, without the need for specific knowledge of the target's GPS coordinate location. In one embodiment, using the automatic slew-to-cue method implemented on a cue camera system 118 associated with a ground control station 104, an operator can more reliably direct the UAV 106 across a potentially unknown distance, even if the distance would otherwise induce latency into the system. Additionally, the methods described herein allow for more reliable operation of a UAV 106 in a situation where there is a possibility of signal loss between the UAV 106 and the ground control station 104.

Another known hostile factor is inaccessibility of the target area. For example, there may be unexploded ordinances on the ground near the target area, live munition striking targets in the area or another cause of inaccessibility, for example, smoke related to a forest fire. This may prevent access to the area by ground troops, and otherwise prevent acquisition of accurate GPS coordinates necessary for conventional flight of the UAV 106. However, in one instance, inspection of the target area must occur in near real time for mission success. Additionally, the operation center 102 may be miles from the target. In one embodiment, a ground control station 104 that is able to automatically launch and retrieve the UAV 106 can be installed within the border of a closed area of operation, but far enough away from the target area as to avoid damage by munitions. In one embodiment the ground control station 104 may be, for example, within one mile of the target area. However, in another embodiment, the ground control station 104 may be further than one mile away from the target area. The operator may be able to, using the systems and methods described herein, direct the UAV 106 to travel the distance from the ground control station 104 to the target area and back, as needed, between operations in the target area, from the safety of the operations center 102.

Another difficulty facing UAV management is the length of time of an extended mission. For example, in one embodiment, a single exercise may require hours on target, or may require visiting and imaging multiple target locations in a row, taxing the battery life of an onboard camera 126 and the fuel reservoirs of the UAV 106. In one embodiment, the UAV 106 interacts with the remote ground control station 104 with an unattended, automatic battery charging module 112, fueling station 116 and/or video offload module 114. In one embodiment, while one UAV 106 is interacting with the modules on ground control station 104, a second UAV 106 is launched to allow for continuous surveillance of a target area.

A better method for directing UAV 106 to a target is desired. For example, in many cases a target location changes throughout the mission as conditions shift. For example, in a forest fire scenario, hot zones of the fire may shift and change over time as weather conditions change and firefighting is conducted. Therefore, even if a GPS location of a target was known at the outset of a mission, the exact GPS coordinates of where the UAV 106 is needed at a later time may be unknown and/or changing, as the UAV 106 approaches the target area. Additionally, because of potential visibility challenges, it may be difficult for a pilot of a UAV 106 to fly using the video feed, or other control mechanism, from the UAV 106 itself, for example due to smoke or other inclement weather. However, by implementing a slew-and-cue method as described herein, the UAV 106 may be directed to the target with decreased complexity. In one embodiment, the UAV 106 is enabled with an inspection camera, for example camera 126, and a video enabled commercial grade, heavy lift multi-rotor and communications units, for example communications unit 128. This embodiment enables an operator of the UAV 106 to realize a significant reduction in cost over the typical expense of high end, military grade systems without compromising the information obtained or the quality of the mission. It may also reduce the training requirements for an operator of the UAV 106.

In another embodiment, the UAV 106 is enabled for automatic launch and retrieval from the operation center 102. For example, the UAV 106 may be launched by command from an operator within the operation center 102, to the control software such that the UAV 106 can execute an assigned mission profile and return to base. In the embodiment where the operation center is a significant distance from the target, or if the mission is extensibly long or changes during the mission time parameters, it may be necessary to launch the UAV 106 from the ground control station 104 with automated support.

Control System for Remote Control of a Vehicle

Figure 1B:
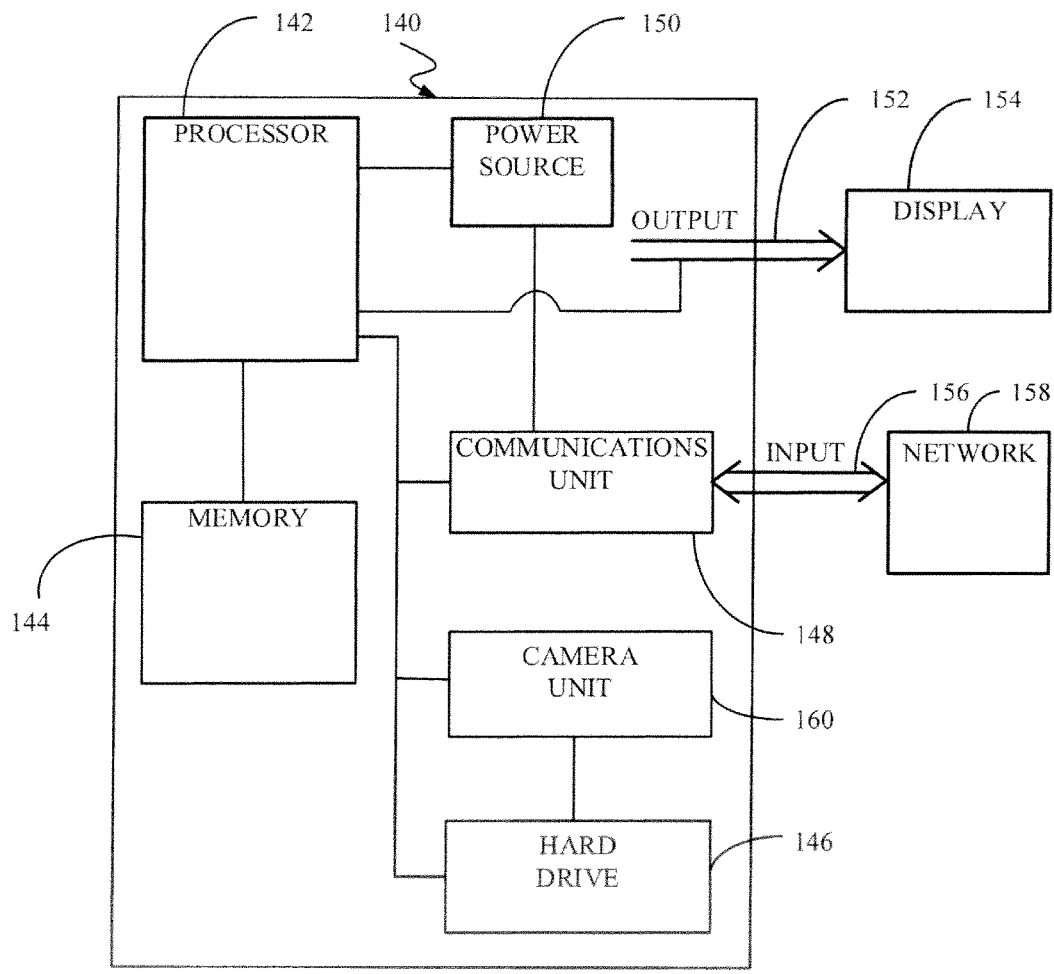
FIG. 1B illustrates an exemplary computing device in accordance with one embodiment of the present invention.

In one embodiment, the UAV 106 is programmed with control software such that it can receive commands directly from the operation center 102 or commands relayed through the ground control station 104. The control software may be implemented on an exemplary computing device 140 as shown in FIG. 1B. In one embodiment, a similar computing device 140 may be present in the operation center 102, the ground control station 104, and/or the UAV 106 such that the operation center 102, the ground control station 104, and the UAV 106, can successfully communicate with each other.

FIG. 1B illustrates an exemplary computing device in accordance with one embodiment of the present invention. As shown in FIG. 1B, an exemplary computing system 140 may comprise at least a processor 142 capable of sending and receiving commands via communications unit 148. Additionally, computing system 140 also includes a random access memory 104, a non-volatile memory 146, communications unit 148, power source 150, an output interface 152, and an input interface 156. In the embodiment where the exemplary computing device 140 is located within the operation center 102, the output interface 152 may be connected to a display 154 and the input interface 156 may be connected to the network 158, such that camera images from the ground control station 104 and/or the UAV 106 can be received by the operation center 102 and displayed on the external display 154.

In the embodiment where the exemplary computing device 140 is implemented on the ground controls station 104 and/or the UAV 106, the exemplary computing device 140 may also comprise access to a camera unit 160, such that it can command an external camera to take images and/or video feed, and store the images and/or video feed and otherwise relay them back to the ground control station 104 and/or the operation center 102.

Software System for UAV Control

In one embodiment, the unmanned aerial vehicle 106 is programmed with control software such that it can receive and comply with commands sent from the operation center 102 either directly to the UAV 106 or through communications relay with the ground control station 104. In one embodiment, the control software is also viewable by an operator within the operation center 102, for example on the interactive user interface 200, shown in FIG. 2A-2E.

FIGS. 2A-2E illustrate exemplary graphical user interfaces of a UAV slew-to-cue system in accordance with one embodiment of the present invention. In one embodiment, mission profiles may change during a mission after the UAV 106 has left the operation center 102 or the ground control station 104 on its way to a target location. During an exemplary mission, it may be necessary for an operator of the UAV 106 to change one or more coordinates or waypoints previously given to the UAV 106, in response to new information, for example, changing mission parameters. The operator may need to stop a current trajectory of the UAV 106, and transition it into a holding pattern, while determining where the next waypoint needs to be in order to best complete the mission. For example, in the forest fire scenario, if a wind shifts after the UAV 106 has left its starting location, the fire path may change, likely requiring the UAV 106 to be sent to monitor a different location than the initially programmed target area.

Additionally, the operator may need to transition the UAV 106 from an autonomous mode to a first person or line-of-sight control, based on a change in conditions in the field. In one embodiment, the UAV 106 is programmed with control software that allows it to transition in and out of the slew-to-cue control mode into other control modes to fit the different conditions the operator encounters during an individual mission with the UAV 106. In one embodiment, however, the slew-to-cue control mode allows the UAV 106 to fly in an autonomous manner without a dedicated pilot. The slew-to-cue method may allow for an operator, without UAV-specific pilot training, for example, to direct the UAV 106 through received images from the UAV 106 and/or the ground control system 104, using an intuitive and user-friendly control interface. The ability to utilize personnel without specialized training on an automated, user-friendly interface may cut down on both pilot-related error and fatigue-related error.

Some examples of the benefits of using a slew-to-cue method over conventional UAV flight techniques are the cost effective and precise control of a video-enabled inspection UAV 106, increased ability to handle hostile factors in an area of operations with minimal manual intervention by an operator, and the ability to utilize operators without specific training in piloting a UAV. The control means of the slew-to-cue method allows for operators to control the UAV with minimal training as, in one embodiment, the UAV controls are intuitive.

Figure 2A:
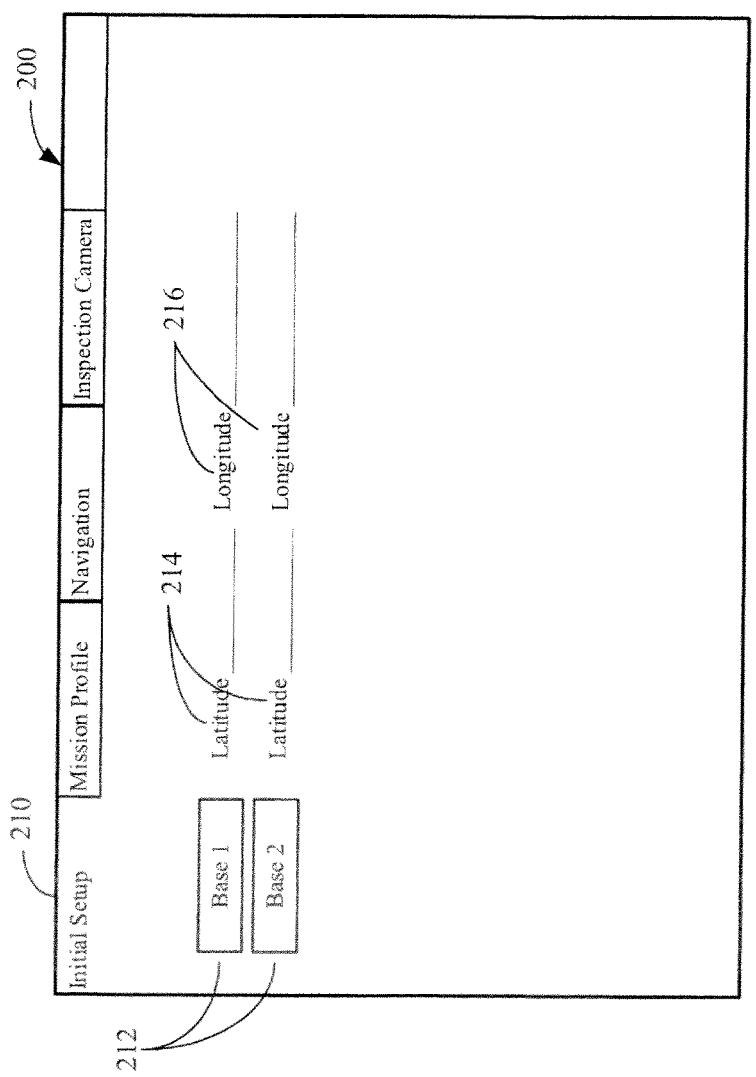
FIGS. 2A-2E illustrate exemplary graphical user interfaces of a UAV slew-to-cue system in accordance with one embodiment of the present invention.

FIG. 2A illustrates an exemplary initial setup view 210 for a software control system 200 that is configured to support a slew-to-cue control mode. In one embodiment, UAV 106 may be pre-programmable with a set of waypoints such that, once set, the UAV 106 is directed through the series of pre-programmed waypoints and returns to either the operation center 102 or the ground control station 104 without the need for any changes in direction directed by the operator. In one example, a user of the UAV control software in the operation center 102 may see an exemplary user interface 200 with set-up screen 210 allowing for an input of a plurality of locations 212 with latitudes 214 and longitudes 216. In the embodiment where the UAV 106 is flying through a series of known waypoint locations, the waypoints can be preprogrammed with GPS coordinates. Additionally, the waypoints may be preprogrammed through other measures, for example by selecting previously-saved coordinate sets, current locations of one or more ground control stations 104, or a previous target location for the UAV 106 in service, or another UAV previously sent to the target area. While FIG. 2A illustrates only two exemplary waypoints, it is to be understood that the UAV 106 could be preprogrammed to fly through more than two waypoints in the course of completing a mission.

In one embodiment, the initial set up screen 210 is configured to receive additional waypoints throughout a mission. For example, in the forest fire scenario, when a change in wind is detected, an operator may add an additional waypoint, either through the slew-to-cue method described below with respect to FIG. 7, or through entry of conventional GPS coordinates, in the embodiment where the new location is known.

Figure 2B:
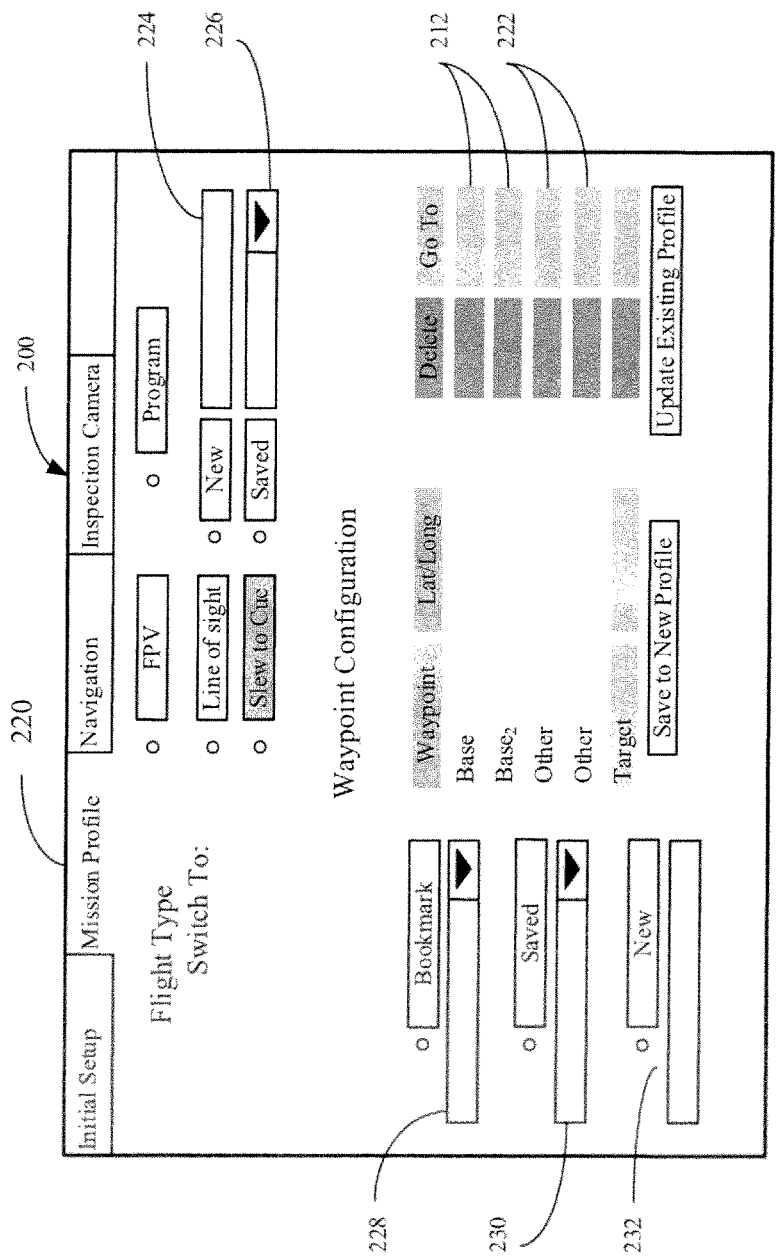

FIG. 2B illustrates a mission profile view 220 for a software control system for a UAV as shown on an exemplary graphical interface 200 in one embodiment. As shown in FIG. 2B, the mission profile view 220 may comprise a series of selected waypoints that may include one or more operation centers 102 or ground control stations 104 and/or an eventual target area. In an embodiment where these waypoints are known, a latitude and longitude of other GPS instructions can be programmed into the mission profile. As shown in FIG. 2B, it may be possible also to indicate that the UAV 106 should maintain a holding pattern for a certain amount of time at each of the selected waypoints, in order to capture, for example a plurality of still photos or a live video feed from the holding position. Additionally, as indicated in FIG. 2B, it may be possible to delete a waypoint from the pre-programmed order, or re-order the waypoints. Once entered, a series of waypoints may be saved as a profile for easy retrieval. Additionally, once the order of waypoints has been changed by an operator, the viewed order of waypoints can be updated.

A user may be able to, using the mission profile view 220, create a new mission profile 224 or scroll through a series of saved programs 226. The saved programs may involve waypoints previously known or previous targets whose GPS coordinates have since been determined, or whose relative locations are known with respect to other known waypoints. For example, during a mission, a user may bookmark 228 a current location of the UAV 106 to use as a waypoint in the future. The bookmarked location may have known GPS coordinates, calculated GPS coordinates relayed from the UAV 106, or may only be known through its relative location to the previous waypoint. Additionally, the GPS coordinate of the bookmarked location may be determinable using coordinate geometry as described below with respect to FIGS. 7A and 7B. The user may also be able to retrieve saved waypoints 230 or otherwise enter a new waypoint 232 either as an intermediary or endpoint. This allows for UAV 106 to be launched from an operation center 102 or a ground control station 104 with a dynamic mission profile. This is helpful in a situation where ground conditions change throughout the mission as an operator of the UAV 106 is easily able to use the mission profile tab 220 of the graphical user interface 200 to update the mission profile of the UAV 106 as needed. This may allow for the mission to be completed in a shorter period of time, or may allow for more efficient UAV management, as the UAV 106 does not need to complete a current mission and come back in order to be preprogrammed and set out with a new autonomous mission profile once the ground conditions are known and updated by an operator.

Figure 2C:
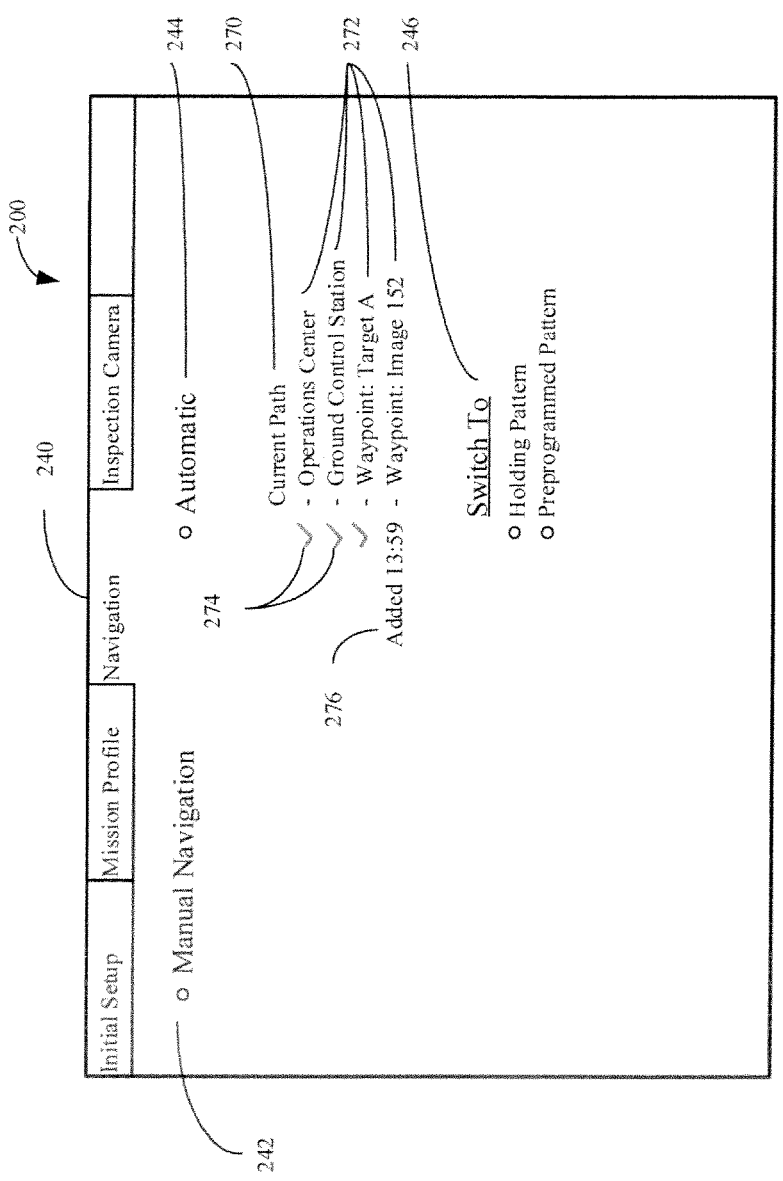

FIG. 2C illustrates an exemplary navigation tab 240 for a software control system for a UAV on an exemplary graphical interface 200. In one embodiment, on the navigation tab 240 a user of the graphical user interface 200 may switch between a manual flight mode 242 and an automatic mode 244. The manual flight mode 242 may comprise, for example, either line of sight or first person view control of a UAV. In one embodiment, the control mode may not allow for a transition to manual mode without a login of an operator authorized to control the UAV 106 in a manual operation mode.

In one embodiment, the automatic mode 244 may show a current mission path 270 of the UAV 106 with the one or more currently programmed waypoints 272 listed. The waypoints 272 may be indicated as achieved 274, meaning that they have already been passed through, and potentially imaged, by the UAV 106. Additionally, as shown in FIG. 2C, additional waypoints 272 may be added along with an indicator of when they were added to the current path 270 and, in one embodiment, by whom. In one embodiment, as shown in FIG. 2C the added waypoint may be a preprogrammed location, for example starting from an operation center 102 and flying to a ground control station 104, and to a preprogrammed waypoint target A. However, in another embodiment the added waypoint may be selected from an image received from either the UAV 106 or the ground control station 104, and displayed to an operator in the operations center 102. In one embodiment, the image-based waypoint may be indicated as such, for example as shown in FIG. 2C that the most recently added waypoint is based off of an image numbered 152. Additionally, a time and date stamp may be attached to waypoints added after the automatic navigation path is set. For example, a timestamp 276 of 13:54 is associated with the last waypoint 272 in the current path 270. Additionally, for security reasons, the name or ID number of the operator of the interface 200 may also be associated with new waypoints as they are added to the current path 270. However, the operator information may or may not be shown on the navigation tab 240 for aesthetic reasons, but may still be retained in a database configured to store information pertaining to pending and completed mission profiles.

Additionally, through navigation view 240, a user of the graphical user interface 200 is presented with additional options to switch to other preprogrammed automatic navigation paths, for example a holding pattern or another preprogrammed pattern, such as a circle pattern around a target area, where the circle pattern may have a set radius, for example 500 feet around the target area at a preset altitude, for example 200 feet. Alternatively, the parameters of the preprogrammed pattern may be entered by an operator when the automatic navigation path is selected.

Figure 2D:
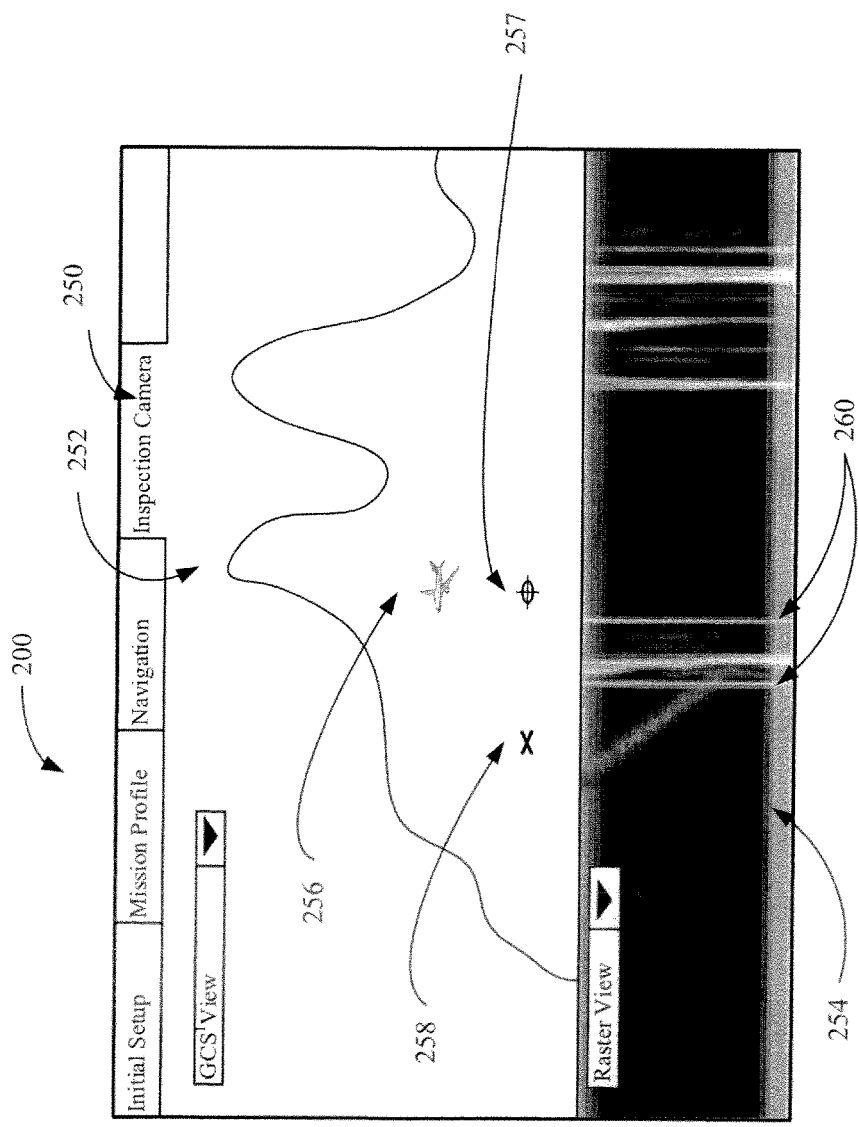
Figure 2E:
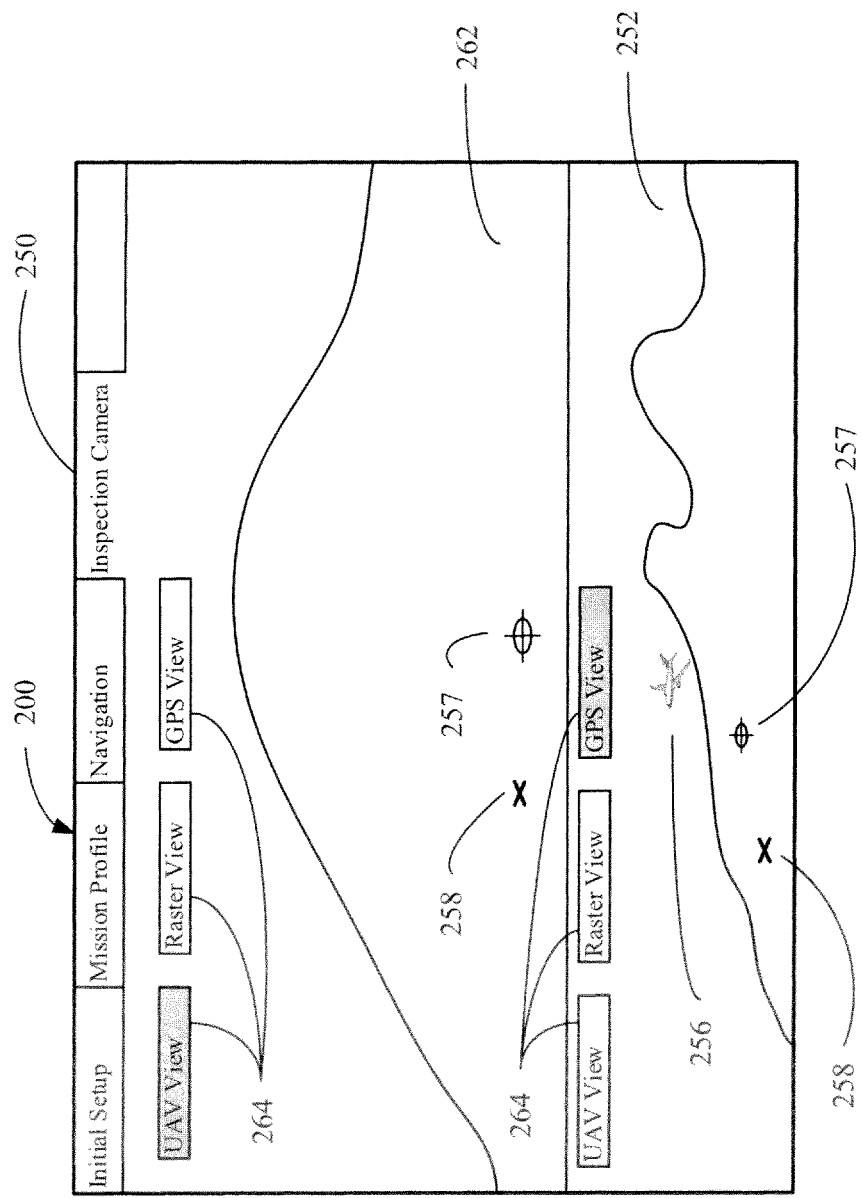

The graphical user interface 200 may also include an inspection camera view 250, configured to show one or more camera feeds as received in substantially real time from either the UAV 106 and/or the cue system on the ground control system 104. The inspection camera tab 250 may populate from a cue camera associated with the ground control station 104 or may populate directly from a camera unit 126 associated with the UAV 106. Additionally, for example as shown in FIGS. 2D and 2E the user interface 200 may show a split screen of video taken from one or more cameras, associated with either the UAV 106 and/or the ground control station 104, or from data associated with camera images taken. For example, as shown in FIG. 2D, the inspection camera tab 250 comprises a ground station control view 252 and a raster view 254, where each of the views 252 and 254 may present a video feed in real time from camera data delivered from a cue camera system associated with a ground control station 104. The raster view 254 may be based on the ground control station view 252 or may be based on data from another source. For example, in one embodiment where the UAV 106 is imaging a forest fire area, the raster view 254 may be generated from thermal data taken from the UAV 106 while flying over the target area. This may indicate particular areas that are hot with a current fire and distinguish these from areas that are cooler but still obscured by smoke, for example.

In one embodiment, the ground control station view 252 comprises at least a view of a target 258 and the UAV 256. The ground control station view 252 may also comprise a cursor 257 that an operator may manipulate across the ground control station view 252, for example by an external mouse or through a touch screen associated with a display 154. A user of the user interface 200 may manipulate the cursor 257 to indicate a new target for the UAV 106. For example, the target area 258 may now be an outdated target, and the operator may want to direct the UAV 106 to move instead to the new target area indicated by cursor 257. Using the slew-to-cue method, the operator may select a new target using the cursor 257, and by selecting the new target on the ground control station view 252, send a command to the UAV 106 to proceed to the selected new target area.

The raster view 254 as shown in FIG. 2D may comprise indications of intensity 360. In one embodiment, the raster view 254 is based on thermal imaging of the area by the UAV 106, and the indications of intensity 260 indicate areas where the fire is burning hottest. However, the indications of intensity 260 could also be indications of inclement weather, for example hail or strong rain, or indications of wind intensity. Alternatively, the indications of intensity 260 could comprise indications of exploded ordinances or indications of other hostile factors that are important to an operator of the user interface 200 and the UAV 106.

FIG. 2E illustrates another exemplary view of inspection camera view 250. In FIG. 2E, a UAV view 262 is presented in conjunction with a ground control station view 252. In one embodiment, the user may select between a plurality of views during or after a mission, for example as indicated by the view selection options 264. The UAV view 262 may comprise at least the indicated target area 258 and a cursor 257. This may allow a user of the user interface 200 to select or update a desired target from, for example old target 258 or to a new target indicated by the cursor 257. Alternatively, a user may wish to add an intermediate waypoint, for example to initiate a holding pattern such that the UAV 256 can monitor the target area 258 for a period of time from the newly selected waypoint indicated by cursor 257. In one embodiment, cursor 257 may be configured to receive camera-related commands, such as a request to focus a camera (either a UAV-related camera generating the view 262, or a ground control station-related cue camera generating the view 252) on the area indicated by cursor 257, or to zoom in or out with respect to the area indicated by cursor 257.

Ground control station view 252 may comprise, as indicated in FIG. 2E, at least the target 258, the UAV 256 and a cursor 257. In one embodiment, the user interface 200 is configured such that only one cursor 257 is available between the adjoining ground station view 252 and the UAV view 262 such that only one cursor 257 appears on the user interface 200 in any given time, and an operator is able to select a new waypoint or deliver a camera-related command on either screen. However, in another embodiment, each view has an associated cursor 257.

In one embodiment, the cursor 257 allows a user of the user interface 200 to select a new waypoint, for example by actuating the cursor 257. In another embodiment, entry of a new waypoint also requires entry of an authorization code by the operator such that an accidental change of course is less likely to occur. However, in another embodiment, actuation of the cursor 257 only switches between views, for example allows a user to zoom in on the live image or video feed generated by a cue camera system 118 associated with the ground control station 104 or a camera 126 associated with the UAV 106. In one embodiment, the cursor 257 offers both functionalities of changing a view presented on the inspection camera tab 250 as well as selecting a new waypoint 257, through different actuation mechanisms, for example. Actuation of the cursor 257 may comprise, for example, touching the screen and dragging and dropping the cursor 257, in an embodiment where the screen is a capacitive touchscreen. Actuating cursor 257 may comprise, in an alternative embodiment, dragging and dropping the cursor 257 through the use of an external device, for example a computer mouse or joystick. Additionally, actuation may comprise another actuation mechanism of the cursor 257 such that a control scheme is activated offering camera control and/or UAV control options for the operator to choose. In one embodiment, the control scheme may comprise a wizard that retrieves the necessary indications from an operator prior to calculating and programming new directions for the UAV 106.

In one embodiment, for example as shown in FIGS. 2D and 2E, a live image feed from the UAV 106 may be paired with another output, for example a live feed from a camera associated with the ground control station 104 or an alternate visual feed. Additionally, while only two views are shown in each of FIGS. 2D and 2E, it is to be understood that more than two views could be shown, for example a still photo from a UAV-associated camera in conjunction with a live feed from each of a UAV-related camera and a ground control station related cue camera. This may allow, for example, an operator to analyze the still photo in conjunction with the one or more live feeds. Additionally, the operator may choose to only show, for example, the video feed from a cue camera on the inspection camera view 250, in order to better select a new waypoint. In one embodiment, the new location can be selected either from the still photo or a video feed.

One or more of the image feeds may be a thermal or other image, which may be either a recently taken camera image or a live video feed. In one embodiment, an operator of the user interface 200 can use the slew-to-cue method on the graphical user interface 200 of the FIGS. 2D and 2E. For example, the operator may want to direct the UAV 106 to a portion of the target area 258 in order to check, for example, on the progress of firefighters in a forest fire. This may comprise changing a current target of the UAV 106 from previously indicated target 258 to a newly indicated target area, for example, derived from the cursor 257. Alternatively, this may involve adding a new waypoint to the mission path of a UAV 106, for example by entering coordinates, selecting a saved waypoint, or using the slew-to-cue method to select a new waypoint using the cursor 257. In a traditional UAV control mode, the operator would need coordinates or UAV-specific pilot training in order to fly the UAV manually to the newly selected target area. However, using a UAV with a slew-to-cue mode enabled, an operator can select one or more new waypoints using any of the camera feeds of FIGS. 2D and 2E shown above.

Different cameras or different camera modes may be available for different situations. In one embodiment, the camera used in the slew-to-cue method takes images in the visible light spectrum. In another embodiment, the camera takes images or video in the 3.5-9 micrometer mid-wave thermal wave for general inspection. In another embodiment, the camera takes images or video in the 3.8-4.05 micrometer mid-wave thermal range in order to see through flames. In another embodiment, the camera takes images or video in the 3.2-3.4 micrometer mid-wave thermal range tuned to image volatile organic compounds. In another embodiment, the camera takes images or video in the 8-14 micrometer long-wave thermal range tuned to image oil slicks. In another embodiment, the camera takes images or video in the 8-8.6 micrometer long-wave thermal range tuned to image refrigerant compounds. In another embodiment, the camera takes images or video in the 10.3-10.7 micrometer long-wave thermal range tuned to image anhydrous ammonia.

The camera used in the slew-to-cue method may be mounted, in one embodiment, on the UAV 106 or, in another embodiment, on ground control station 104. Additionally, there may be multiple inspection cameras on a single ground control station 104 or UAV 106. This may allow an operator a greater visual range in order to select the appropriate next waypoint. For example, as shown in FIG. 2D, there may be drop down menu allowing a user to select between a plurality of views, for example a ground station camera view 1, camera view 2 or a plurality of UAV camera views.

Methods of Directing a UAV to a Target Location

FIGS. 3-6 illustrate methods of directing a UAV to a target location in accordance with embodiments of the present invention.

Figure 3:
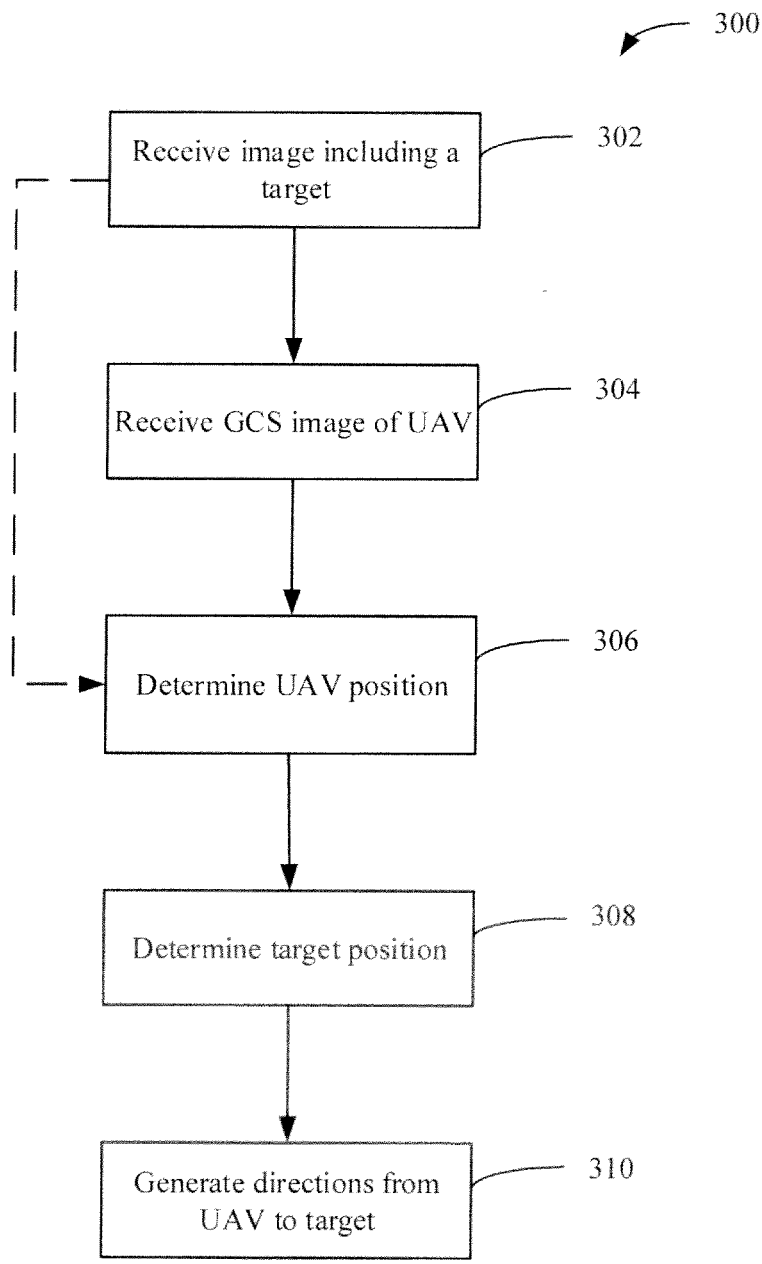
FIG. 3 illustrates an exemplary method of generating directions to a target for a UAV in accordance with one embodiment of the present invention.

FIG. 3 illustrates an exemplary method of generating directions to a target for a UAV in accordance with one embodiment of the present invention. Method 300 may be used to generate relative directions from a current position of a UAV 106 to newly selected target. Method 300 may also comprise determining and providing coordinate-based directions to a UAV 106. In one embodiment, the image received in block 302 is received from a cue camera system 118 associated with the ground control station 104. However, in another embodiment, the received image in block 302 may come directly from the UAV 106.

In one embodiment, in block 304, an image is received from the ground control station 104 that at least includes the UAV within the image. In the embodiment where the operation center 102 communicates directly with the UAV 106, block 304 may instead designate receipt of an image of the UAV 106 from a cue camera associated with the operation center 102. The image may also comprise the indicated new target area, or may only include an indication of a current location of the UAV 106.

In block 306, in one embodiment, the UAV's current position is determined from the camera image received in block 304. The current position of the UAV 106 may be a relative position, for example relative to the ground control station 102. Alternatively, the UAV's current position may be transmitted from the UAV 106 directly, and may be an absolute location derived from an internal GPS module within the UAV 106. In the embodiment where the image received in block 302 is transmitted from the UAV 106 itself, the method may optionally progress from block 302 to block 306 directly, as indicated in FIG. 3.

In one embodiment, after a current position of the UAV 106 is determined, either relative or absolute, a relative or absolute position of the new target is determined based on the image received in block 302. This may be accomplished, for example, using the known location of the UAV 106 to determine a distance between the UAV 106 and the selected new target. Based on, for example, the calculation method shown in FIGS. 7A and 7B.

In block 310, directions are generated and sent to the UAV 106, such that the UAV can travel from its current location to the newly selected target location. These directions may be automatically sent to the UAV 106, or they may be presented to an operator on the user interface 200 such that the operator has to confirm the directions before altering the UAV's current path. The additional step requiring the operator confirmation may reduce the chance of accidently changing a current path of the UAV to an undesired location. In one embodiment, the entirety of method 300 is accomplished automatically upon actuation of a cursor 257, for example. In an embodiment where method 300 is accomplished automatically, a confirmation option may appear to an operator prior to the transmission of new waypoint instructions to the UAV 106. This may allow, for example, any operator in the operations center 102, to select a new waypoint, and direct the UAV 106 to proceed to the new waypoint, using the graphical user interface 200 without any specialized pilot training.

Figure 7A:
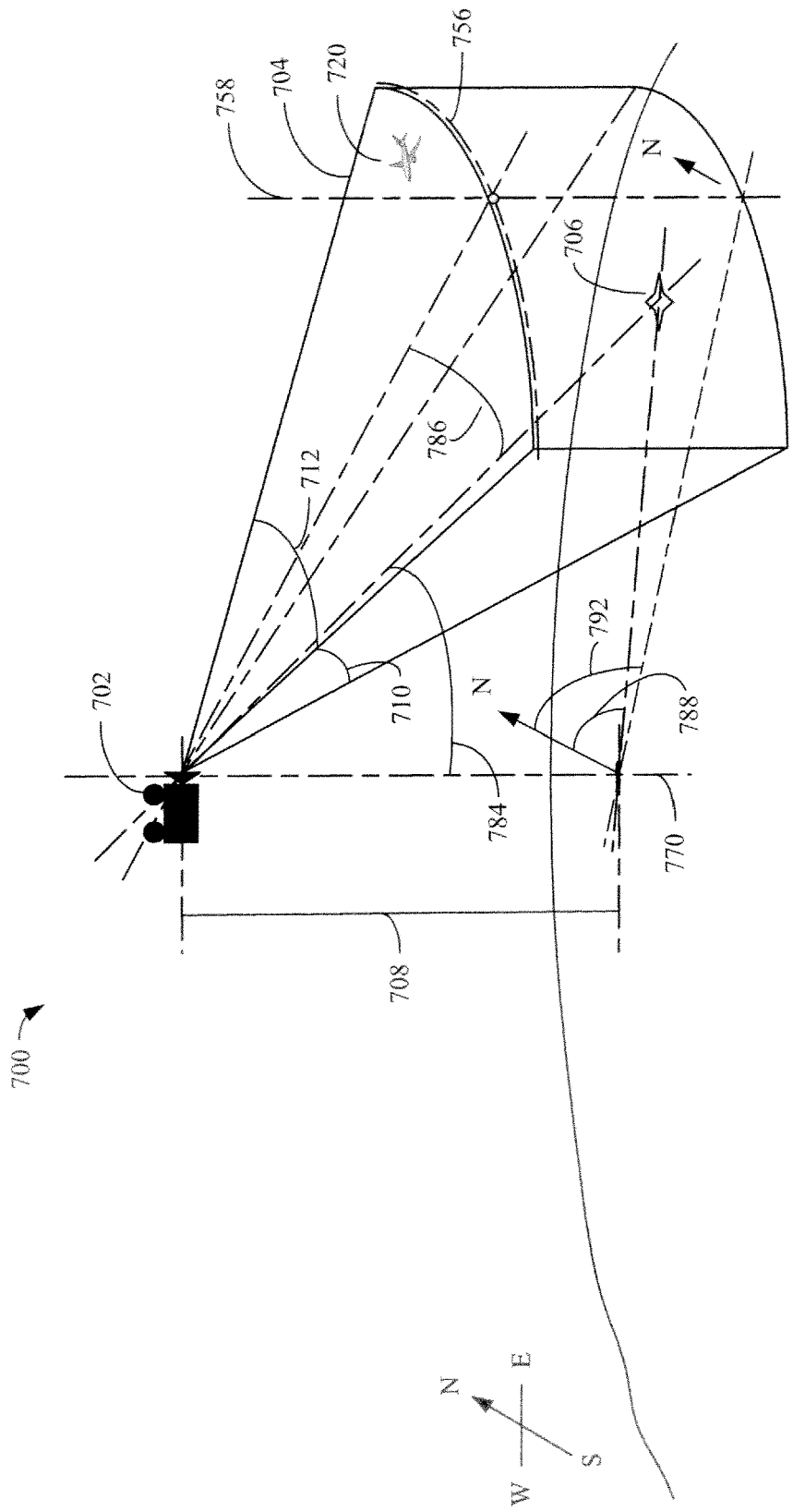
FIGS. 7A and 7B illustrates an exemplary calculation of a position of a selected target in accordance with one embodiment of the present invention.
Figure 7B:
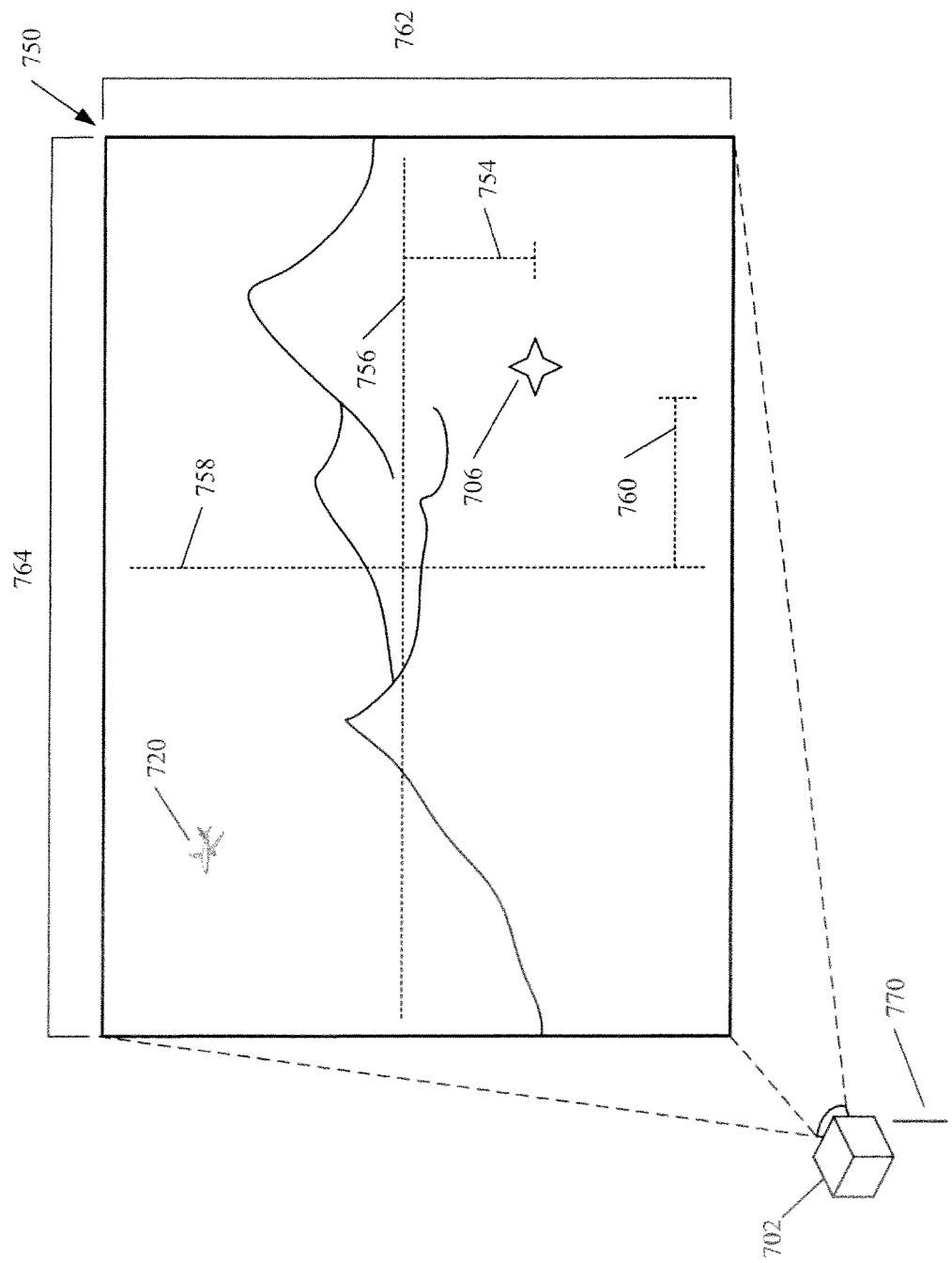

In one embodiment, each frame of a cue camera video feed, for example, generated from a cue camera system 118 associated with ground control station 104, comprises an image that can be mapped to a Cartesian system of coordinates with an x and y axis, as the UAV travels close enough to the surface of the earth that its curvature can be disregarded Once an exemplary position is selected within a single frame of the live video feed or a most recently captured or acquired camera image, in one exemplary method, the x-y coordinates of the selected position with the image, are automatically translated into a latitude or longitude address for the selected new target area, as explained in the calculation illustrated in FIGS. 7A and 7B. Using this method, an operator viewing a scene produced by a cue camera can, in one embodiment, direct an aerial camera, for example on a UAV, to a desired location at a selected height. Moreover, the UAV can be provided with information indicating a heading from which to view the selected location.

Figure 4:
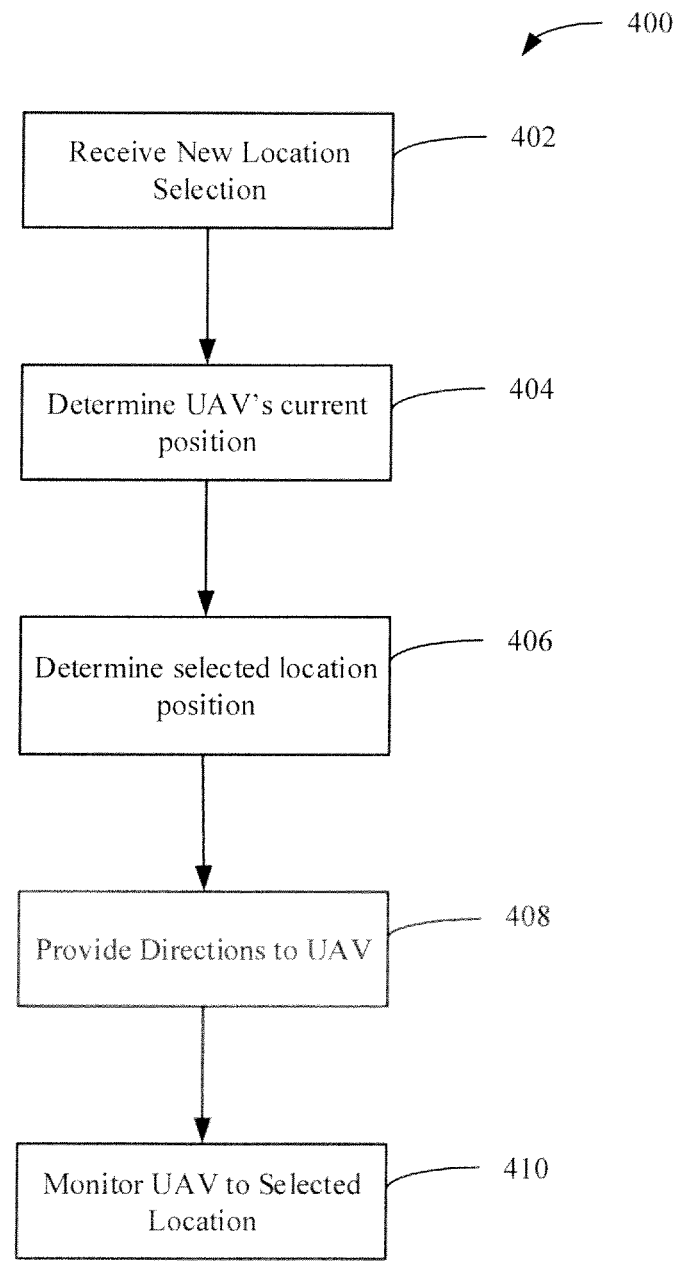
FIG. 4 illustrates an exemplary method of directing a UAV to a target in accordance with one embodiment of the present invention.

FIG. 4 illustrates an exemplary method of directing a UAV to a target in accordance with one embodiment of the present invention. In one embodiment, an inspection camera is part of the cue camera system 118 associated with the ground control station 104 and is characterized as an aerial slew-to-cue (ASTC) camera. The ASTC camera may be utilized, for example, in method 400 in order to direct a UAV to a selected target area utilizing the slew-to-cue method.

In block 402, a selection of a new target location is received by the control system. The selection may come from an operator viewing a feed from the inspection camera, for example on the inspection camera view 250 of the graphical user interface 200. The receipt of the new location in block 402 may be, for example, received from actuation of the cursor 257 indicating a position on a video feed from the ASTC camera, for example.

In block 404, the control software determines a UAV's relative current position to the ASTC. In another embodiment, the UAV's absolute position is determined and expressed in GPS coordinates. The GPS coordinates representing the UAV's current position may be presented to an operator of the control software, for example through the user interface 200.

In block 406, the relative position of the selected new target location is determined, for example using one of the methods for determining a coordinate address described below, for example with regard to FIG. 7.

In block 408, directions are provided to the UAV 106 based on the relative position of UAV 106 to the selected location, or the absolute position of the selected location. In one embodiment, directions comprise only sending coordinates of the selected location to the UAV 106, which automatically calculates directions. The directions may also comprise, in another embodiment, a calculated heading, distance, and altitude.

In one embodiment, in block 410, the control system is configured to monitor the UAV 106 as it proceeds to the selected location. The method 400 may be repeated periodically through a mission profile as new target areas are selected, requiring the control system to repeat the steps listed in block 402, 404, 406, 408, and 410 repeatedly throughout the process as new waypoints are selected during the mission. However, in an instance where the process is repeated, the UAV's current relative position of UAV 106 may be determined as the relative position of the previously selected location, such that block 404 may be omitted from the method 400 after a first iteration of the method 400 is completed.

Figure 5:
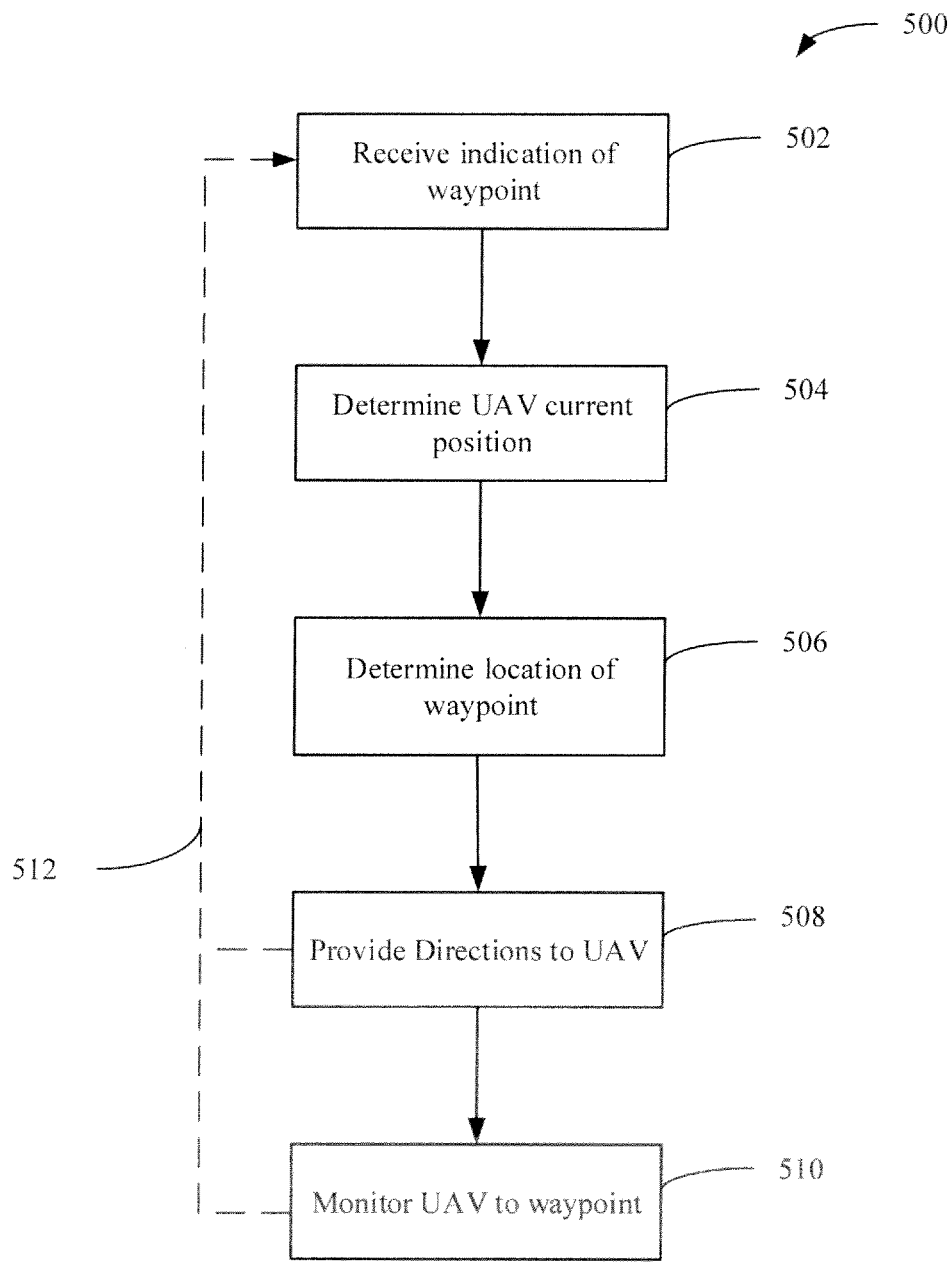
FIG. 5 illustrates an exemplary method of utilizing waypoints to control a UAV's flight path in accordance with one embodiment of the present invention.

FIG. 5 illustrates an exemplary method of utilizing waypoints to control a UAV's flight path in accordance with one embodiment of the present invention. In block 502, an indication is received of a new waypoint. The indication may be actuation of the cursor 257 on a live image feed, for example. The indication may also be a selection of a new position based on a previous image taken by an ASTC camera, or a previous frame in a video feed captured by the ASTC camera. The indication may be received during a current mission, for example after the UAV 106 has left the operation center 102 or a ground control station 104. In another embodiment, the indication may be received prior to the start of a mission. For example, in an embodiment where multiple UAVs 106 are utilized over a period of time in a single mission, the first waypoint for a second UAV 106 may be a current position of a first UAV 106 prior to the first UAV 106 returning to either the operations center 102 or the ground control station 104. In one embodiment, the indication of a new waypoint comprises an indication given on an image currently shown on a graphical user interface, for example graphical user interface 200, through the live inspection camera view 250.

In block 504, the relative current position of the UAV 106 is determined. This may be accomplished using any of the geometric methods described below, for example with regard to FIG. 7. The position of the UAV 106 may be determined relative to the ground control station 104 or the operations center 102, or may be an absolute location expressed using GPS coordinates.

In block 506 a relative location of a selected new waypoint is determined, for example using any of the geometric methods described below, for example with regard to FIG. 7. The position of the selected waypoint may be determined relative to either the UAV 106 or the ground control station 104, for example, or may be determined in absolute GPS coordinates.

In block 508, directions are generated and provided to the UAV 106 based on the detected current relative position of the UAV 106 and a location of the new waypoint. In one embodiment, directions comprise only sending coordinates of the selected location to the UAV 106, which automatically calculates directions. The directions may also comprise, in another embodiment, a calculated heading, distance, and altitude provided to the UAV 106.

In block 510, the control system may monitor the UAV 106 from its current position to the newly programmed waypoint and, for example, provide an indication to an operator that the new waypoint has been achieved. Additionally, in one embodiment, the control system may also provide an indication of time remaining until the next waypoint is achieved. The method 500 may then be repeated, for example as shown through recycle arrow 512 as new waypoints are added to a mission profile.

Figure 6:
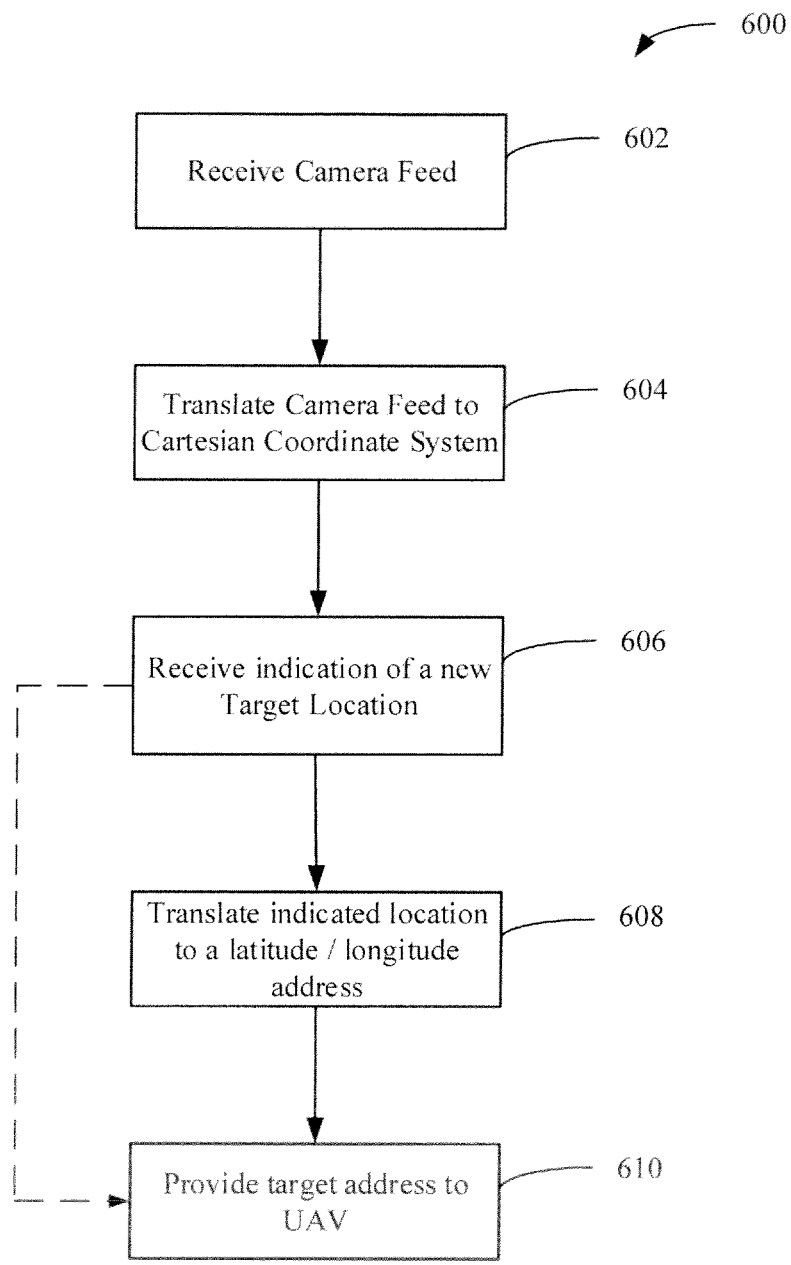
FIG. 6 illustrates an exemplary method of providing a target address to a UAV in accordance with one embodiment of the present invention.

FIG. 6 illustrates an exemplary method of providing a target address to a UAV that may be useful in one embodiment of the present invention. The target address may comprise an address of a new waypoint, for example determined through method 400 or method 500. In one embodiment, the method 600 starts in block 602 wherein an image feed is received by a control system. The image feed may comprise a live video feed or a plurality of still images taken by a camera.

In block 604, in one embodiment, once the image has been received, the image may be translated to a system of Cartesian coordinates, presented to an operator of the UAV on the graphical user interface 200 and calculated, for example, as shown in FIG. 7B.

In block 606, an indicated new target area is received, where the target is indicated on the received image feed. In one embodiment, a coordinate system is not applied to every image received, but only after a selected new target is indicated.

In block 608, the indicated new target area is translated into a corresponding latitude and longitude address. The latitude and longitude address may be absolute latitude and longitude or they may be relative to a current position of the UAV 106 in one embodiment, for example as expressed in compass-based directions.

In block 610 the new target address is provided to the UAV 106. In one embodiment, method 600 is implemented on a computing device at the operation center 102. However, in another embodiment, the method 600 is implemented on a remote ground control station, for example ground control station 104. Method 600 may also comprise providing an indication that the UAV 106 is still on target to achieve the indicated new target area and, in one embodiment, an indication when the new target area is achieved.

Method for Determining a Coordinate Address

FIGS. 7A-7B illustrate exemplary calculations of directions to a selected target that may be useful in one embodiment of the present invention. FIG. 7A illustrates an exemplary physical depiction of a camera unit 702, remote from the UAV 106 and in proximity to a selected next target 706. However, in another embodiment camera unit 702 could be located on the UAV 106. The coordinate position of the selected target 706 may be desired in either absolute coordinates or as relative distance and heading from a current position of the camera 702, depending on a format chosen by the operator. Either format may be transmitted to the UAV 106, in one embodiment. For example, relative distance may be desired in order to determine whether the UAV 106 can achieve the selected location on current fuel reserves. In one embodiment, the control system detects a current fuel reserve and determines whether or not the UAV 106 can achieve the desired waypoint based on fuel and/or battery reserves.

The position of the camera 702 may be, in one embodiment, proximate to the ground control station 104. The directions to the selected target 706 may, then, be expressed as directions from the ground control station 104. The known position of the UAV 106 and the ground control station 104 may also be used, in one embodiment, to provide directions from the UAV 106 to the selected target 706.

FIG. 7B illustrates an exemplary diagram 750 presenting a UAV 720 in proximity to a selected target 706. The selected target may, in one embodiment, be indicated by an operator of the UAV 720, for example on a graphical interface 200. In one embodiment, a method (for example, any of methods 400, 500 or 600) is provided whereby an inspection camera, for example a camera on UAV 720, is autonomously flown from a base or a remote, unmanned ground control station to the latitude and longitude of a target's position, which may be calculated as shown in FIGS. 7A and 7B. In another embodiment, a method is provided to autonomously fly an aerial inspection camera from a base, to a selected target position in response to a selection of a position in an image or video frame.

The latitude and longitude of the selected target 706 may be, in one embodiment, derived from the live image, for example an image substantially similar to diagram 750, taken by a geo-referenced cue camera, for example camera 702, associated with a ground control station 104. The geo-referenced cue camera 702, in one embodiment, provides the cue for the target location of the UAV 720. In one embodiment, once the location of the selected target 706 is determined, the control software on the UAV 720 then executes the prescribed surveillance profile, for example entered by an operator of the UAV 720. In another embodiment, the control software may be located at the ground control station 104 and may remotely communicate with the UAV 720 to transmit instructions for proceeding to the selected target 706.

In one embodiment, for example the exemplary physical depiction of FIG. 7A, a camera field of view 704 extends forward from a lens on camera 702. The location of camera 702, camera height 708, vertical camera field of view angle 710 and horizontal camera field of view angle 712 may be known variables. In one embodiment, the known variables are provided by the camera 702 manufacturer, a GPS unit and an altimeter on the camera 702. Using these variables, a calculation can be done to find the coordinate address corresponding to selected point 706, located within the field of view 704.

In one embodiment, an operator of a UAV 720 is presented with an image sent from a camera, for example camera 702, on the user interface 200. The image may correspond to the diagram 750. The operator can select a position, for example using cursor 257, in the displayed image and a coordinate point will be returned, in one embodiment. In the diagram of FIG. 7B, the selected new target area corresponds to selected point 706. The diagram 750 optionally includes, a vertical center line 758 and a horizontal level line 756. The horizontal level line 756 may represent the edge of a flat plane such that the line 770 is the normal line of the plane, which may represent a hypothetical line projecting from the center of the earth to the camera's location. The vertical center line 758 may represent the edge of a plane that is parallel (coplanar) with both a line 770 and the bearing direction 792 corresponding to the view of camera 702.

In one embodiment, the vertical camera field of view angle 710, the horizontal camera field of view angle 712, the vertical distance from level 754, and the horizontal distance from center 760 can be used to calculate an angular position 784 of selected position 706 in relation to camera 702. A camera has a known field of view angle and a lens resolution (in both horizontal and vertical dimensions), measured in pixels. The vertical distance from level 754 and horizontal distance from center 760, in one embodiment, may be measurable in pixels. In one embodiment, Equations 1 and 2 may be used to calculate the angular position 784 between the camera 702 and the selected target 706.

$$\text{horizontal angular position} = \frac{\text{horizontal FOV angle}}{\text{horizontal resolution}} \times \text{Distance from center line} \quad \text{Equation 1}$$

$$\text{vertical angular position} = \frac{\text{vertical FOV angle}}{\text{vertrical resolution}} \times \text{Distance from level line} \quad \text{Equation 2}$$

In Equation 2, the vertical field of view angle 710, is divided by the vertical resolution 762 to obtain a vertical angle to pixel ratio. Multiplying the vertical angle to pixel ratio by the vertical distance from level 754 will calculate the vertical component 786 of angular position 784, in one embodiment. In Equation 1, the horizontal field of view angle 712, is divided by the horizontal resolution 764 to obtain a horizontal angle to pixel ratio. Multiplying the horizontal angle to pixel ratio by the horizontal distance from center 760 will calculate the horizontal component 788 of angular position 784, in one embodiment. In one embodiment the camera 702 may be pointed at such an angle that horizontal level line 756 may not be in the camera field of view 704. In such a scenario, a calculated theoretical distance from horizontal level line 756 would be used. In another embodiment, the angular position 784 of the select point 706 could also be determined with the use of accelerometers and compasses within the camera 702.

Using trigonometry, the calculated angular position 784 can be combined with the height 708, bearing direction 792 and the GPS location of the camera 702 to calculate the GPS coordinates corresponding to point 706, for example using Equations 3 and 4 as well. For more accuracy, the curvature of the Earth and terrain (from WGS84 for example) can also be included in the calculation. Within short distances, however, the assumption that the Earth has a flat surface may be sufficiently accurate, allowing for the curvature of the Earth to be ignored. In one embodiment, where distances are short enough that a planar accuracy is sufficient, the following equations may be used to determine the coordinate address for selected point 706.

$$x_2 = x_1 + \frac{(\sin\theta_1 \times \tan\theta_2 \times h)}{R_{Earth}} \quad \text{Equation 3}$$

$$y_2 = y_1 + \frac{(\cos\theta_1 \times \tan\theta_2 \times h)}{R_{Earth}} \quad \text{Equation 4}$$

The calculation diagram of FIG. 7B corresponds to the variables of Equation 3 and Equation 4 above. The coordinate pair $(y_1, x_1)$ corresponds to the latitude and longitude of the camera 702. The variable h corresponds to the camera height 708. $R_{Earth}$ corresponds to the radius of the Earth. The angle $\theta_1$ corresponds to the bearing of the camera view 788, where bearing is measured in clockwise degrees from polar north. The angle $\theta_2$ corresponds to the angle 784 between the camera view and the line 770. The coordinate pair $(y_2, x_2)$ corresponds to the latitude and longitude of the selected point 706. Therefore, Equations 3 and 4 facilitate calculation of the latitude and longitude of the selected point 706.

Once the coordinate address for selected point 706 is calculated, directions can be transmitted to the UAV 720, in one embodiment. Directions to selected point 706, may comprise, in one embodiment, relative locations from the UAV 720, or camera 702, to the selected point 706. In another embodiment, the directions may be in given in terms of absolute locations. In another embodiment, only the bearing 788 and distance between camera 702 or UAV 720 and selected location 706 is transmitted.

While the present invention has been described with respect to the control of a UAV, workers skilled in the art will recognize that the systems and methods could be used to control any remote-controlled vehicle with an associated camera feed. For example, the slew-to-cue control method could also be used to move a ground control station 104 into an initial position using a WAV camera feed associated with the ground control station 104.

Additionally, the slew-to-cue control methods and interfaces could be used, for example, to control movement of a remotely-controlled land vehicle facing hospitable conditions, for example remotely maneuvering a vehicle in desert or other remote locations. The slew-to-cue control methods and interface could also be used, for example, to maneuver an aquatic vehicle over water, for example a boat or other water-based vehicle. Additionally, the slew-to-cue control method could be implemented, in one embodiment, as an application to allow a person to control a remote-controlled vehicle from a portable computing device, for example a phone, tablet or other appropriate device.

Although the present invention has been described with reference to preferred embodiments, workers skilled in the art will recognize that changes may be made in form and detail without departing from the spirit and scope of the invention.

What is claimed is:

1. A system for unmanned vehicle control, the system comprising:
    an image acquisition device configured to capture an image of an operational area remote from a ground control station, wherein the image acquisition device is located remote from the ground control station and a vehicle;
    the vehicle configured to receive and execute a vehicle control command;
    a control device configured to generate the vehicle control command comprising:
        a display component configured to present the image obtained from the image acquisition device in substantially real-time;
        an input component configured to receive an input indicating a particular position on the displayed image from the image acquisition device located proximate to the ground control station, wherein indicating a particular position comprise selecting a pixel within the displayed image;
        a processor configured to obtain and display the image from the image acquisition device, on the display component, in substantially real-time, determine a coordinate address of the vehicle based on a detected location of a pixel corresponding to the vehicle within the image, and determine a coordinate address based on the received input indicating the particular position, based on the selected pixel, and generate the vehicle control command based on the determined coordinate address; and
    a communication component configured to facilitate transmission of the vehicle control command to the vehicle, wherein the communication component comprises at least a ground control station configured to function as a relay for the transmission of the vehicle control command between the control device and the vehicle.

2. The system of claim 1, wherein the image acquisition device is configured to capture an image comprising information within a visible light spectrum of light, wherein the light spectrum comprises the wavelengths range of 400-600 nm.

3. The system of claim 1, wherein the image acquisition device is configured to capture an image comprising information outside a visible light spectrum of light, wherein the visible light spectrum comprises the wavelengths range of 400-600 nm.

4. The system of claim 1, wherein the control of the vehicle can be switched to a manual flight control mode.

5. The system of claim 1, wherein the display component comprises a touch screen and wherein the input component comprises a portion of the touch screen.

6. The system of claim 1, wherein the vehicle base station comprises a fuel storage component configured to engage with and refuel the vehicle.

7. The system of claim 1, wherein the input indicating a particular position on the displayed image comprises a cursor selection of the pixel.

8. The system of claim 1, wherein the input indicating a particular position on the displayed image comprises a selection received from an external device.

9. The system of claim 8, wherein the external device is a computer mouse.

10. The system of claim 8, wherein the external device comprises a touchscreen.

11. A method for vehicle control, the method comprising:
receiving, utilizing a processor associated with a computing device, a video teed from an imam acquisition device located at a ground control station which is at a first location, remotely located from a second location, wherein the second location corresponds to a location of an aerial vehicle, and wherein the video feed is received substantially in real-time;
displaying the video feed on a display component of the computing device, wherein the video feed is received in substantially real-time, from the image acquisition device at the ground control station;
determining, a position of the aerial vehicle based on the received video feed from the image acquisition device located at the ground control station, wherein determining the position of the aerial vehicle comprises identifying a pixel within an image of the received video feed corresponding to the aerial vehicle and, based on the identified pixel, determining a coordinate location of the aerial vehicle;
receiving, utilizing the processor, an input on an input component of the computing device, wherein the input specifies a pixel on the image of the received video feed;
automatically calculating, utilizing the processor, a coordinate location of the specified pixel on the received video feed;
generating directions based on the determined position of the second location and the coordinate location of the specified pixel; and
sending the generated directions to the aerial vehicle, wherein sending comprises the processor transmitting the directions through a communication component.

12. The method of claim 11, wherein the aerial vehicle is an unmanned aerial vehicle.

13. The method of claim 11, wherein the display component comprises a touch screen and wherein the input component comprises a portion of the touch screen.

14. A method for remote control of an aerial vehicle, the method comprising:
receiving in substantially real-time, utilizing a computing device with a processor, a video feed from an image acquisition device at a first location, wherein the video feed is received along with an associated capture location and an associated bearing of the image acquisition device, and wherein the first location is remotely located from a second location corresponding to a location of the aerial vehicle, and wherein the first location is remotely located from a third location corresponding to a location of the vehicle base station;
displaying the video feed on a display component of the computing device in substantially real-time, utilizing the processor;
receiving an input through an input component of the computing device, wherein the input specifies a pixel within the displayed video feed received in substantially real-time from the image acquisition device at the first location;
automatically calculating, utilizing the processor, a coordinate location corresponding to the specified pixel;
sending the coordinate location of the selected pixel to the aerial vehicle, wherein sending comprises the processor transmitting the calculated coordinate location through a communication component and, wherein, upon receiving the coordinate location, the aerial vehicle is configured to automatically progress to the coordinate location; and
monitoring, utilizing the processor, a location of the aerial vehicle during the progression to the coordinate location.

15. The method of claim 14, wherein the aerial vehicle is an unmanned aerial vehicle.

16. The method of claim 14, wherein the video feed comprises a previously taken video feed.

17. The method of claim 14, wherein the video feed is captured from the aerial vehicle.

* * * * *